US009426675B2

(12) United States Patent
Liu et al.

(10) Patent No.: US 9,426,675 B2
(45) Date of Patent: Aug. 23, 2016

(54) SYSTEM AND METHOD FOR ADAPTATION IN A WIRELESS COMMUNICATIONS SYSTEM

(71) Applicant: FutureWei Technologies, Inc., Plano, TX (US)

(72) Inventors: Jialing Liu, Palatine, IL (US); Binnan Zhuang, Evanston, IL (US); Weimin Xiao, Hoffman Estates, IL (US); Ning Guo, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/198,108

(22) Filed: Mar. 5, 2014

(65) Prior Publication Data

US 2014/0269313 A1 Sep. 18, 2014

Related U.S. Application Data

(60) Provisional application No. 61/798,531, filed on Mar. 15, 2013.

(51) Int. Cl.
*H04W 24/02* (2009.01)
*H04W 28/08* (2009.01)
*H04W 36/30* (2009.01)
*H04W 36/22* (2009.01)

(52) U.S. Cl.
CPC .............. *H04W 24/02* (2013.01); *H04W 36/22* (2013.01); *H04W 36/30* (2013.01)

(58) Field of Classification Search
None
See application file for complete search history.

(56) References Cited

U.S. PATENT DOCUMENTS

| 2006/0165008 | A1* | 7/2006 | Li ........................ H04L 1/0019 370/252 |
| 2010/0046396 | A1 | 2/2010 | Cai et al. |
| 2010/0054155 | A1 | 3/2010 | Cai et al. |
| 2010/0142405 | A1 | 6/2010 | Cai et al. |
| 2010/0202322 | A1 | 8/2010 | Cai et al. |
| 2013/0286952 | A1* | 10/2013 | Ghosh et al. .................. 370/329 |
| 2013/0301450 | A1* | 11/2013 | Geirhofer et al. ............. 370/252 |

(Continued)

FOREIGN PATENT DOCUMENTS

| CN | 101252538 A | 8/2008 |
| CN | 101282569 A | 10/2008 |
| CN | 101286781 A | 10/2008 |

(Continued)

OTHER PUBLICATIONS

International Search Report, Application No. PCT/CN2014/073432; mailed Dec. 12, 2014, 12 pages.

(Continued)

*Primary Examiner* — Chi H Pham
*Assistant Examiner* — Soon-Dong D Hyun
(74) *Attorney, Agent, or Firm* — Slater Matsil, LLP

(57) ABSTRACT

A method for adapting communications system topology includes receiving, by an adaptation device, first signal plus interference to noise ratio (SINR) values from user equipments in a communications system, the first SINR values associated with a transmission configuration as configured by the communications system, and adapting, by the adaptation device, a topology of the communications system in accordance with the first SINR values received from the user equipments already attached to the communications system.

22 Claims, 21 Drawing Sheets

(56) References Cited

U.S. PATENT DOCUMENTS

2013/0303167 A1* 11/2013 Zhu et al. ............... 455/436
2014/0328327 A1* 11/2014 Xiao et al. .............. 370/332

FOREIGN PATENT DOCUMENTS

| CN | 101287178 A | 10/2008 |
| --- | --- | --- |
| CN | 101287268 A | 10/2008 |
| CN | 101287284 A | 10/2008 |

OTHER PUBLICATIONS

"3rd Generation Partnership Project; Technical Specification Group Radio Access Network; Evolved Universal Terrestrial Radio Access (E-UTRA); Further advancements for E-UTRA physical layer aspects (Release 9)," 3GPP TR 36.814 V9.0.0, Technical Report, Mar. 2010, 107 pages.

Cavalcanti, D., et al., "Issues in Integrating Cellular Networks, WLANs, and MANETs," A Futuristic Heterogeneous Wireless Network, IEEE Wireless Communications, Jun. 2005, pp. 30-41.

Dhillon, H. S., et al., "Load-Aware Modeling and Analysis of Heterogeneous Cellular Networks," Wireless Communications, IEEE Transactions, vol. 12, Issue 4, Jan. 4, 2013, pp. 1666-1677.

Dhillon, H. S., et al., "Modeling and Analysis of K-Tier Downlink Heterogeneous Cellular Networks," IEEE Journal on Selected Areas in Communications, vol. 30, No. 3, Apr. 2012, pp. 550-560.

Dhillon, H. S., et al., "Coverage and Ergodic Rate in K-Tier Downlink Heterogeneous Cellular Networks," Forty-Ninth Annual Allerton Conference, Allerton House, UIUC, IL, Sep. 28-30, 2011, pp. 1627-1632.

Li, G., et al., "Downlink Radio Resource Allocation for Multi-Cell OFDMA System," IEEE Transactions on Wireless Communications, vol. 5, No. 12, Dec. 2006, pp. 3451-3459.

Liu, S., et al., "Inter-Cell Coordination with Inhomogeneous Traffic Distribution," 2006 2nd Conference, Apr. 3-5, 2006, pp. 64-71.

Marsan, M. A., et al., "Optimal Energy Savings in Cellular Access Networks," IEEE International Conference, Jun. 14-18, 2009, 5 pages.

Niu, Z., et al., "Cell Zooming Cost Efficient Green Cellular Networks," IEEE Communications Magazine, Nov. 2010, pp. 74-79.

Oh, E., et al., "Energy Savings through Dynamic Base Station Switching in Cellular Wireless Access Networks," Global Telecommunicationss Conference, Dec. 6-10, 2010, 5 pages.

Pollakis, E., et al., "Base station selection for energy efficient network operation with the majorization-minimization algorithm," Signal Processing Advances in Wireless Communications (SPAWC), 2012 IEEE 13th International Workshop, Jun. 17-20, 2012, pp. 219-223.

Bonald, T., et al., "Inter-Cell Scheduling in Wireless Data Networks," Wireless Conference 2005 and Mobile Communications and Servicess (European Wireless), 11th European, Apr. 10-13, 2005, 7 pages.

Zhou, S., et al., "Green Mobile Access Network with Dynamic Base Station Energy Saving," MobiCom '09, Beijing, China, Sep. 20-25, 2009, 3 pages.

Zhuang, B., et al., "Energy Management of Dense Wireless Heterogeneous Networks Over Slow Timescales," Communication, Control, and Computing (Allerton), 2012 50th Annual Allerton Conference, Oct. 1-5, 2012, pp. 26-32.

* cited by examiner

SYSTEM AND METHOD FOR ADAPTATION IN A WIRELESS COMMUNICATIONS SYSTEM This application claims the benefit of U.S. Provisional Application No. 61/798,531, filed on Mar. 15, 2013, entitled "Methods and System for Network Adaptation in Wireless Networks," which application is hereby incorporated herein by reference.

TECHNICAL FIELD

The present disclosure relates generally to digital communications, and more particularly to a system and method for adaptation in a wireless communications system.

BACKGROUND

Densely deployed heterogeneous networks (HetNets) are destined to become the future of commercial wireless communications systems. A motivation is to deal with a scarcity of resources among increasing demand for data services. Densely deployed small cells are expected to improve the spectral efficiency of the wireless communications system and provide data rate enhancement for high speed data service. However, as the wireless communications systems become denser, inter cell interference (ICI) becomes a major source of performance degradation.

SUMMARY OF THE DISCLOSURE

Example embodiments of the present disclosure which provide a system and method for adaptation in a wireless communications system.

In accordance with an example embodiment of the present disclosure, a method for adapting communications system topology is provided. The method includes receiving, by an adaptation device, first signal to interference plus noise ratio (SINR) values from user equipments in a communications system, the first SINR values associated with a transmission configuration as configured by the communications system, and adapting, by the adaptation device, a topology of the communications system in accordance with the first SINR values received from the user equipments already attached to the communications system.

In accordance with another example embodiment of the present disclosure, a method for adapting communications system topology is provided. The method includes measuring, by an adaptation device, channels between the adaptation device and cells in the communications system, and deriving, by the adaptation device, first SINR values from the measured channels. The method also includes adapting, by the adaptation device, a topology of the communications system in accordance with the first SINR values.

In accordance with another example embodiment of the present disclosure, an adaptation device is provided. The adaptation device includes a receiver, and a processor operatively coupled to the receiver. The receiver receives a first SINR value from user equipments in a communications system, the first SINR values associated with a transmission configuration as configured by the communications system. The processor adapts a topology of the communications system in accordance with the first SINR values received from the user equipments already attached to the communications system.

In accordance with another example embodiment of the present disclosure, an adaptation device is provided. The adaptation device includes a processor. The processor measures channels between the adaptation device and cells in a communications system, derives first SINR values from the measured channels, and adapts a topology of the communications system in accordance with the first SINR values.

One advantage of an embodiment is that the example embodiments consider traffic load at the cells when performing network adaptation. The consideration of traffic load allows for the accounting of cells with potentially differing loads rather than assuming fully loaded cells.

A further advantage of an embodiment is that the example embodiments enable distributed operation if so desired, thereby reducing computational and communicational requirements on any single centralized entity.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to adaptation in a wireless communications system. For example, an adaptation device receives a first SINR value from user equipments in a communications system, the first SINR values associated with a transmission configuration as configured by the communications system, and adapts a topology of the communications system in accordance with the first SINR values received from the user equipments already attached to the communications system. As another example, an adaptation device measures channels between the adaptation device and cells in the communications system, derives first SINR values from the measured channels, and adapts a topology of the communications system in accordance with the first SINR values.

The present disclosure will be described with respect to example embodiments in a specific context, namely a HetNet communications system that allows for topology adaptation. The disclosure may also be applied, however, to standards compliant and non-standards communications systems that allows for topology adaptation, such as Third Generation Partnership Project (3GPP) Long Term Evolution (LTE) compliant, and the like, communications systems.

Figure 1A:
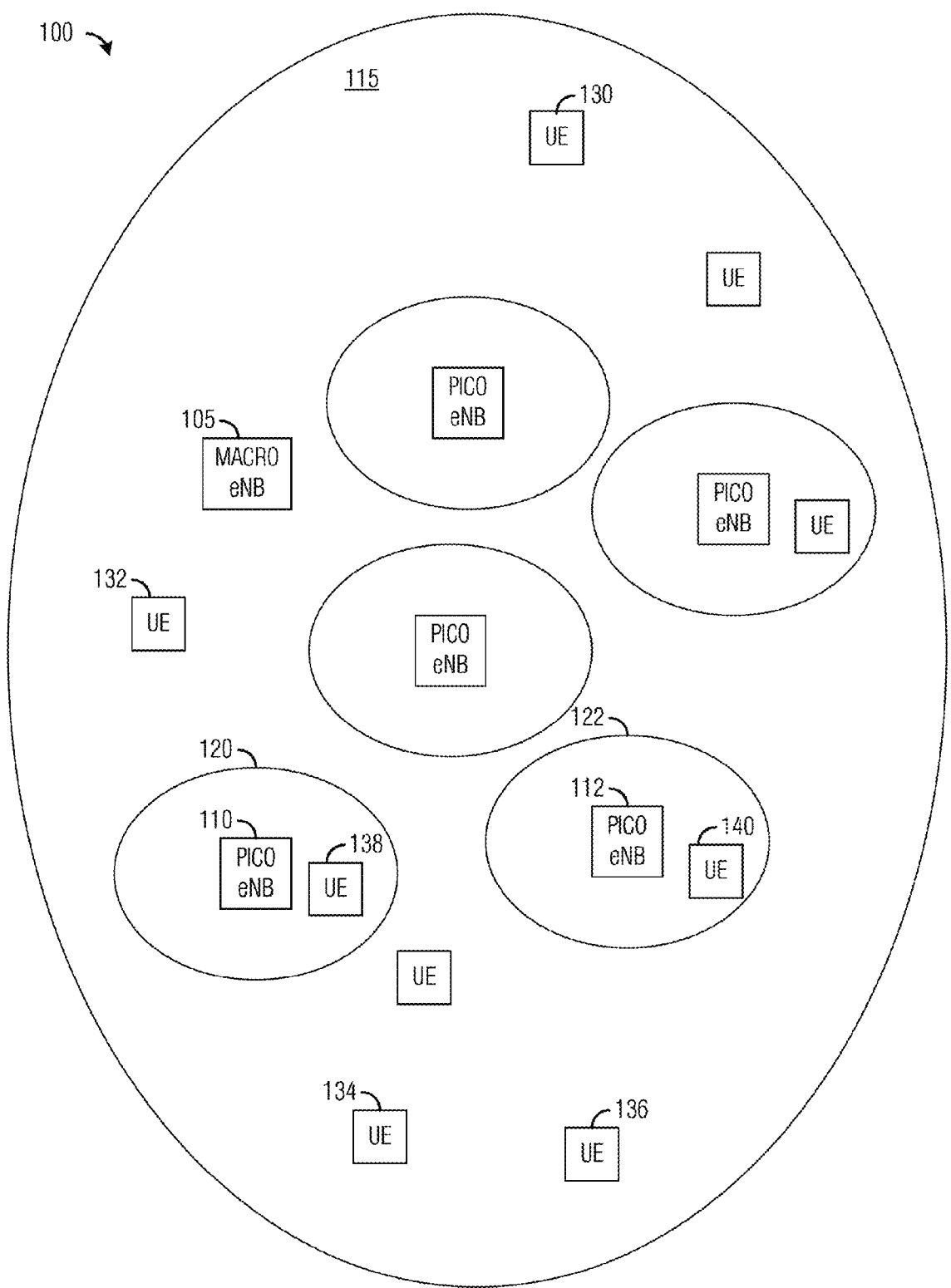
FIG. 1a illustrates an example communications system according to example embodiments described herein.

FIG. 1a illustrates an example communications system 100. Communications system 100 includes both macro cells, such as macro enhanced NodeB (eNB) 105, and pico cells, such as pico eNB 110 and pico eNB 112. As such, communications system 100 may be referred to as a HetNet. The macro cells may be a part of a macro layer forming a heritage cellular communications system that provides basic coverage. The pico cells may be part of a pico layer comprising a deployment of low power nodes for purposes such as rate enhancement and/or coverage improvement. Generally, a macro cell will have a much larger coverage area than a pico cell. As shown in FIG. 1a for example, macro eNB 105 has a coverage area 115, while pico eNB 110 has a coverage area 120 and pico eNB 112 has a coverage area 122. Other terms for cells include base stations, NodeBs, communications controllers, base terminal stations, and the like.

Communications system 100 also includes a plurality of user equipments (UE), such as UEs 130-140. Other terms for UEs include mobile stations, terminals, subscribers, users, and the like. A UE may be served by a macro cell(s), a pico cell(s), or both a macro cell(s) and a pico cell(s).

When a UE first enters (e.g., powers on, resets, and the like) in communications system 100, it may perform an initial attachment with a cell in communications system 100. Initial attachment may entail the UE obtaining information from one or more cells in communications system 100 and then completing a connection with a cell to receive service from communications system 100. In other words, the UE may coordinate with one or more cells and then attach to one of the cells. Furthermore, since UEs are typically mobile in nature, a UE may move out of a coverage area of a first cell and into a coverage area of a second cell. In such a situation, the UE may need to participate in a handover (HO) with the first cell and the second cell in order to retain service from communications system 100. A HO may be considered as the UE detaching from the first cell and re-attaching with the second cell.

While it is understood that communications systems may employ multiple cells capable of communicating with a number of UEs, only one macro cell and a number of pico cells, and a number of UEs are illustrated for simplicity.

Figure 1B:
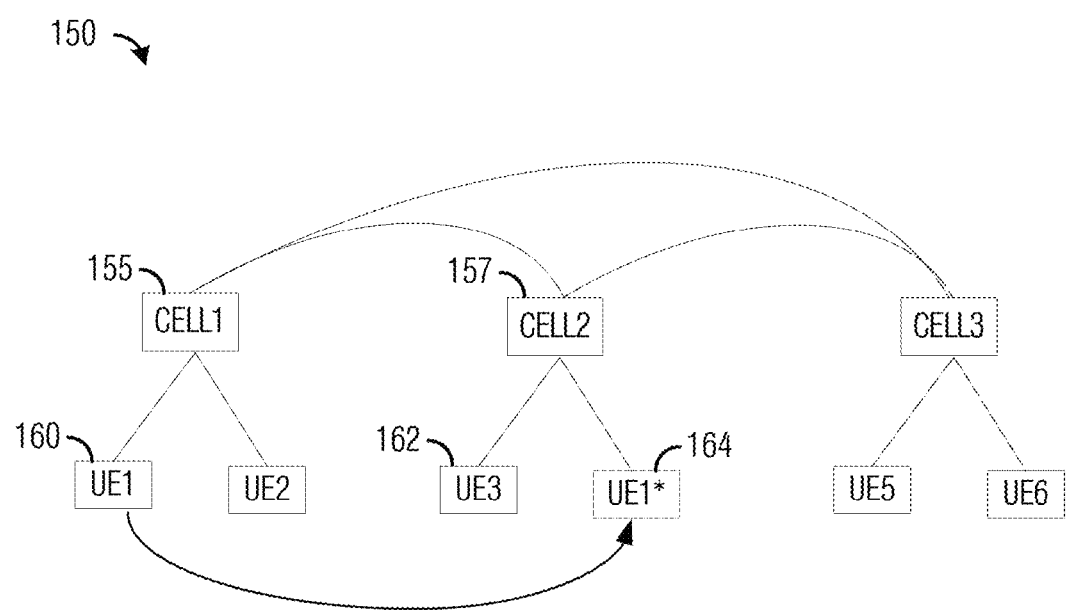
FIG. 1b illustrates an example communications system highlighting UE mobility according to example embodiments described herein.

FIG. 1b illustrates an example communications system 150 highlighting UE mobility. As shown in FIG. 1b, communications system 150 includes cells, such as cell 155 and cell 157. The cells may be either macro cells or pico cells. The cells may be coupled together by a backhaul that may be wireline and/or wireless in nature. The cells may be serving UEs, such as UE 160 being served by cell 155 and UE 162 being served by cell 157. As discussed previously, a UE may participate in a HO to change its attachment to a cell due to its mobility. As shown in FIG. 1b, UE 160 may change its attachment from cell 155 to cell 157 (where it is shown as UE 164 with dashed lines to differentiate it from UE 160).

Figure 2:
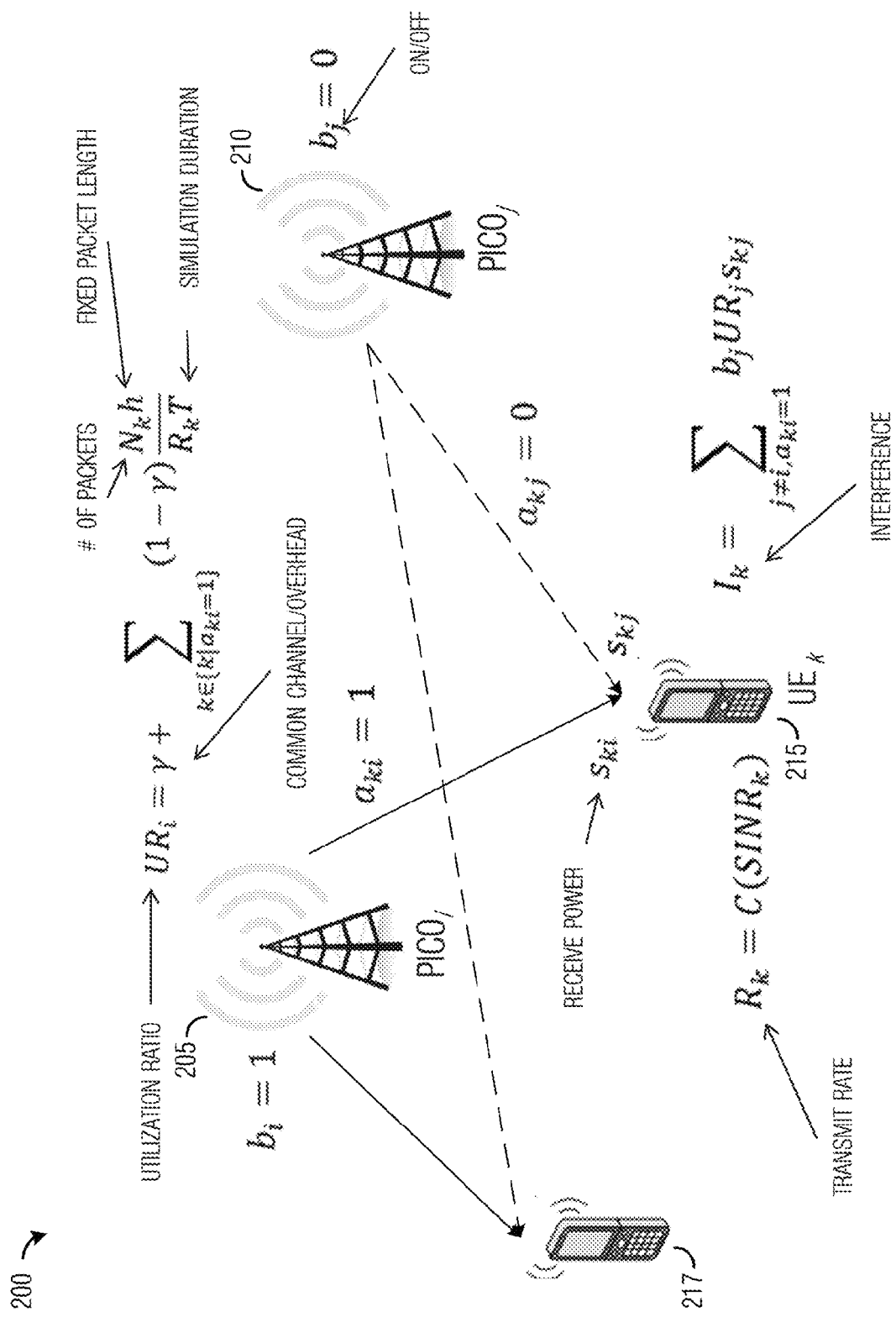
FIG. 2 illustrates an example communications system where a mathematical model is highlighted according to example embodiments described herein.

FIG. 2 illustrates an example communications system 200 where a mathematical model is highlighted. The mathematical model presented in FIG. 2 is an example modeling of communications system 200 and other mathematical models are possible. As shown in FIG. 2, communications system 200 comprises a single layer of pico cells. However, a similar model may be shown for two layer communications systems. Communications system 200 includes N pico cells, such as pico cell 205 (PICO$_i$) and pico cell 210 (PICO$_j$). Communications system 200 also includes K UEs, such as UE 215 (UE$_k$) and UE 217. Signal attenuation from pico cell i to UE k may be expressed as $l_{ik}$, which is modeled by the UMi model in the 3GPP technical standards and includes both pathloss and shadowing. For simplicity, it is assumed that all pico cells transmit to UEs with constant transmit power, $p_t$. Therefore, the received signal power at UE k for a transmission originating from pico cell i is expressed as $p_{ik}=p_t l_{ik}$.

The received SINR at UE k while being served by pico cell i may be expressed as $$\gamma_{ik} = \frac{p_{ik}}{i_{ik} + n_k}, \quad (1)$$

where $i_{ik}$ is the ICI received by UE k and $n_k$ is the noise level at UE k. Hence, the transmit rate from pico cell i to UE k is expressible as $$r_{ik}=C(\gamma_{ik}), \quad (2)$$

which takes into account transmission bandwidth, modulation scheme, coding rates, code efficiency, and receive SINR cap, and the like.

In order to specify the ICI, it may be necessary to introduce a utilization ratio (UR) for a pico cell. The fraction of time within T seconds for a pico cell i to serve UE k is expressible as $$\tau_{ik} = \frac{hN_k}{r_{ik}T}, \quad (3)$$

where h is the constant packet size for all UE packets and $N_k$ is the number of packets arriving within T seconds for UE k. For each pico cell, UE packets may be served using the entire bandwidth based on a first come first served rule, for example. It is noted that other techniques may be used for serving UE packets, including priority, service history, packet size, and the like. For each UE, the packet arrives may be modeled using a Poisson distribution with intensity $\lambda$.

According to Equation (3), the UR of pico cell i is expressible as $$u_i = u_0 + (1-u_0)\Sigma_{k=1}^{K}\alpha_{ik}\tau_{ik}, \quad (4)$$

where $u_0$ is the fraction of time and/or frequency resources occupied by common channel overhead and $\alpha_{ik}$ is the binary association variable, i.e., if $\alpha_{ik}=1$ then UE k is served by pico cell i, otherwise UE k is not served by pico cell i. It is noted that cooperative transmission is not considered here for simplicity, $\Sigma_{i=1}^{L}\alpha_{ik}=1$. Given the UR at all pico cells, the interference at UE k served by pico cell i is expressible as $$i_{ik}=\Sigma_{j=1,j\neq i}^{N}b_j u_j p_{jk}, \quad (5)$$

where $b_j$ is the binary variable indicating the power on or off status of pico cell j. According to Equation (5), the interpretation of interference is in an average sense.

Consequently, the transmit rate and ICI are the long term average of traditional Shannon rate and instantaneous interference. Since the interest is in the communications system performance on slow time scales, long term average statistics may be a good choice for performance metrics. It is noted that the rate, UR, and interference is decided upon by a multivariate nonlinear system formed by Equations (2), (4), and (5). In general, a closed form solution of this nonlinear system may be difficult to achieve, and a numerical iterative method may be used to obtain the solutions.

The user experience may be measured by UE throughput. The l-th packet throughput of UE k served by pico cell i is expressible as $$F_{ik}^l = \frac{h}{\frac{h}{r_{ik}} + w_{ik}^l}, \quad (6)$$

where $w_{ik}^l$ is the time that the l-th packet spends in the queue before its turn for transmission. The throughput of UE k is measured by the average of all packets' throughput for UE k and is denoted by $F_{ik}$. Due to an assumption that macro cells operate on a frequency band orthogonal to the frequency band used by the pico cells, the rate, UR, interference, and throughput in the macro layer may be calculated in the same way as those calculated in the pico layer.

Typically, adaptation, and more specifically, topology adaptation, in a wireless communications system may come in a variety of forms. A first form of topology adaptation comprises cell (pico cell and/or macro cell) selection for attachment or HO, and a second form of topology adaptation comprises cell (normally only pico cell) turn on or off. In cell selection, a cell may be selected by an adaptation device to serve as a target cell of a UE as it participates in an attachment or a HO, where an adaptation device may be a cell, a network entity in the wireless communications system with functionality to operate as a device that controls topology adaptation, or a UE. Although the UE may be allowed to serve as an adaptation device, it may have to send information regarding adaptation decisions to its eNB or a network entity that has final decision on topology adaptation (for example, to accept the topology adaptation decision made by the UE or to perform topology adaptation on its own). The network entity may be a standalone device or it may be co-located with another entity in the wireless communications system. In cell turn on (or off), a cell may be selected by an adaptation device to be turned off if it is currently on (or turned on if it is currently off). Cell turn on (or off) may be referred to as cell state switch. In cell state switch, the adaptation device may be a cell or a network entity in the wireless communications system. It is noted that cell selection and cell state switch may be combined.

Figure 3A:
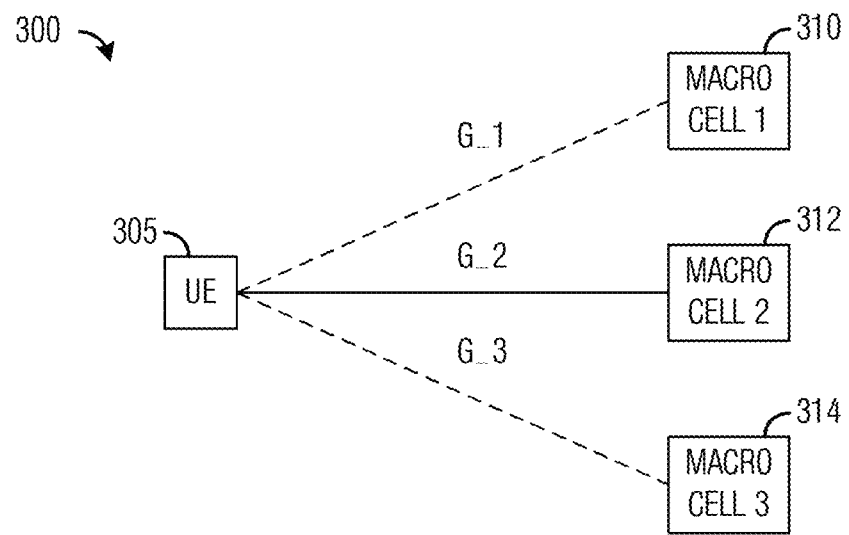
FIGS. 3a through 3c illustrate example cell selection in a wireless communications system according to example embodiments described herein.

FIG. 3a illustrates an example communications system 300 where cell selection in a macro layer is highlighted. Communications system 300 includes a UE 305 and a plurality of macro cells, such as macro cell 310, macro cell 312, and macro cell 314. An adaptation device, which may be one of the macro cells, UE 305, or another network entity in communications system 300 may perform cell selection for UE 305 to select a target macro cell to which UE 305 may attach or handover. The adaptation device may determine a utility G for each of the macro cells with respect to UE 305. As an illustrative example, the utility G may be a SINR of a communications channel between UE 305 and each of the macro cells. Alternatively, the utility G may be a SINR of a communications channel between UE 305 and each of the macro cells plus a function of a UR of each of the macro cells. Alternatively, the utility G may be a throughput of UE 305 with respect to each of the macro cells. In FIG. 3a, the utility G for each of the communications channels is denoted G_1, G_2, and G_3, respectively. The adaptation device may select one of the macro cells as the target macro cell for UE 305 in accordance with the utility G. As an example, the adaptation device may select a macro cell with maximum SINR, maximum SINR plus function of UR, or maximum UE throughput. As shown in FIG. 3a, macro cell 312 is selected as the target macro cell for UE 305.

Figure 3B:
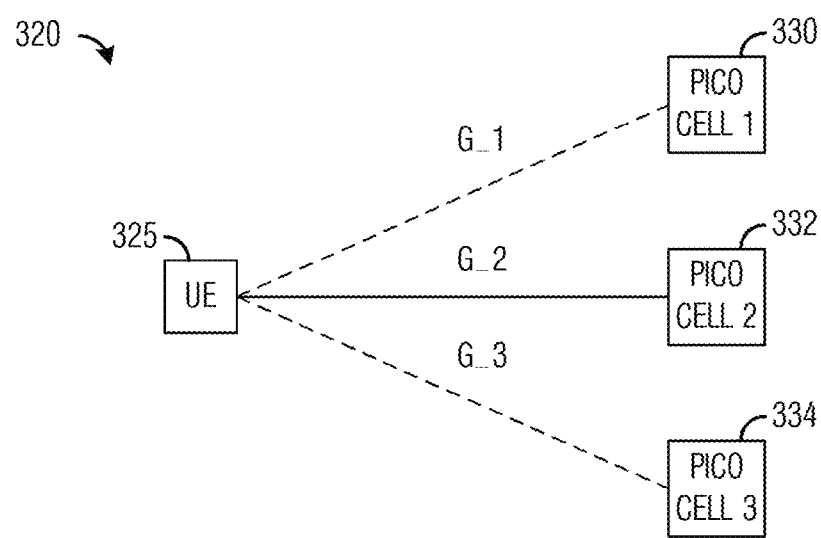

FIG. 3b illustrates an example communications system 320 where cell selection in a pico layer is highlighted. Cell selection may also occur in the pico layer. Communications system 320 includes a UE 325 and a plurality of pico cells, such as pico cell 330, pico cell 332, and pico cell 334. An adaptation device, which may be one of the pico cells, UE 325, or another network entity in communications system 320 may perform cell selection for UE 325 to select a target pico cell to which UE 325 may attach or handover. The adaptation device may determine a utility G for each of the pico cells with respect to UE 325. As an illustrative example, the utility G may be a SINR of a communications channel between UE 325 and each of the pico cells. Alternatively, the utility G may be a SINR of a communications channel between UE 325 and each of the pico cells plus a function of a UR of each of the pico cells. Alternatively, the utility G may be a throughput of UE 325 with respect to each of the pico cells. In FIG. 3b, the utility G for each of the communications channels is denoted G_1, G_2, and G_3, respectively. The adaptation device may select one of the pico cells as the target pico cell for UE 325 in accordance with the utility G. As an example, the adaptation device may select a pico cell with maximum SINR, maximum SINR plus function of UR, or maximum UE throughput. As shown in FIG. 3b, macro cell 332 is selected as the target pico cell for UE 325.

Figure 3C:
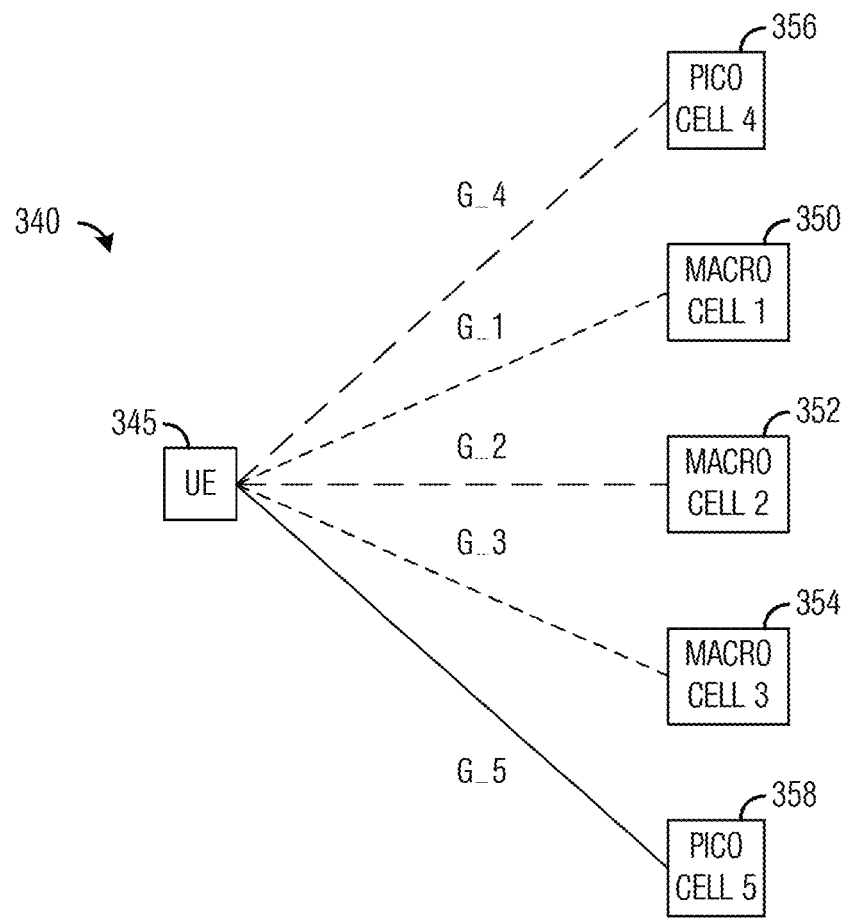

FIG. 3c illustrates an example communications system 340 where cell selection in both a pico layer and a macro layer is highlighted. Cell selection may occur in both the pico layer and the macro layer. Communications system 340 includes a UE 345 and a plurality of macro cells, such as macro cell 350, macro cell 352, and macro cell 354, and a plurality of pico cells, such as pico cell 356 and pico cell 358. An adaptation device, which may be one of the macro cells, one of the pico cells, UE 345, or another network entity in communications system 340 may perform cell selection for UE 345 to select a target cell to which UE 345 may attach or handover. The adaptation device may determine a utility G for each of the macro cells and each of the pico cells with respect to UE 345. The adaptation device may select one of the macro cells or one of the pico cells as the target cell for UE 345 in accordance with the utility G. As an example, the adaptation device may select a cell with maximum SINR, maximum SINR plus function of UR, or maximum UE throughput. As shown in FIG. 3c, pico cell 358 is selected as the target cell for UE 345.

Figure 4A:
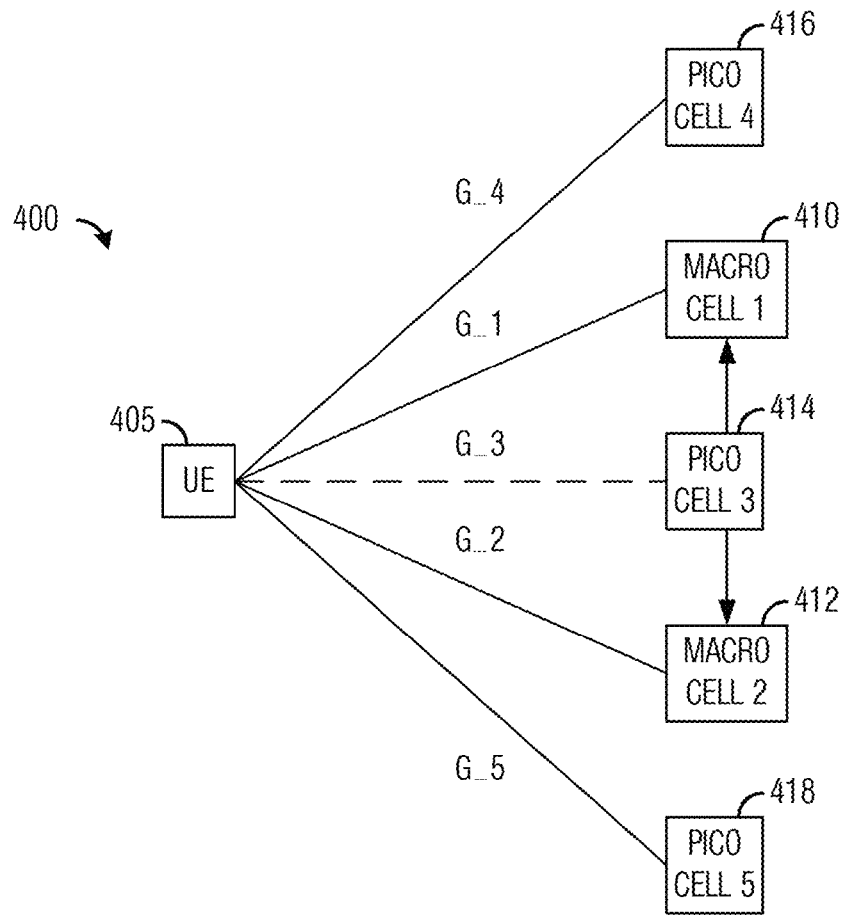
FIGS. 4a and 4b illustrate example cell state switch in a wireless communications system according to example embodiments described herein.

FIG. 4a illustrates an example communications system 400 where cell state switch is highlighted. Communications system 400 includes a UE 405 and a plurality of macro cells, such as macro cell 410 and macro cell 412, and a plurality of pico cells, such as pico cell 414, pico cell 416, and pico cell 418. An adaptation device, which may be one of the macro cells, one of the pico cells, UE 405, or another network entity in communications system 400 may select a cell (such as one of the pico cells) to turn on (or off), i.e., perform cell state switch. The adaptation device may select the cell to turn on or off in accordance with a utility G, a number of UEs served by each of the cells, cell throughput, cell latency, cell load, and the like. For discussion purposes, consider a situation wherein the adaptation device has selected pico cell 414 to turn on or off. Part of the process may include the adaptation device determining if any performance gain is achieved if pico cell 414 is turned off.

As an illustrative example, the adaptation device may simulate the impact of turning off pico cell 414 on communications system 400. Prior to simulating the impact of turning off pico cell 414, the adaptation device may determine a first performance measure of communications system 400 or a portion of communications system 400 that includes pico cell 414. An example of the performance measure include sum UE throughput. The adaptation device may simulate load balancing by moving UEs served by pico cell 414 to other cells, such as macro cell 410 and macro cell 412. It is noted that load balancing may move UEs to macro cells and/or pico cells, therefore the illustration of moving the UEs to macro cells is not intended to limit the scope or the spirit of the example embodiments. The adaptation device may simulate turning off pico cell 414 and then compute a second performance measure of communications system 400 or a portion of communications system 400 that includes pico cell 414 (in an off state). The second performance measure should measure the same metric as the first performance measure.

The adaptation device may compare the first performance measure to the second performance measure and if there is an improvement in performance measures with pico cell 414 turned off, the adaptation device may actually commence with the load balancing of pico cell 414 and turning off pico cell 414. As an example, there may be an improvement in performance measures if the second performance measure exceeds the first performance measure by a threshold. If there is not an improvement in performance measures, the adaptation device may leave communications system 400 as configured, i.e., leave pico cell 414.

Figure 4B:
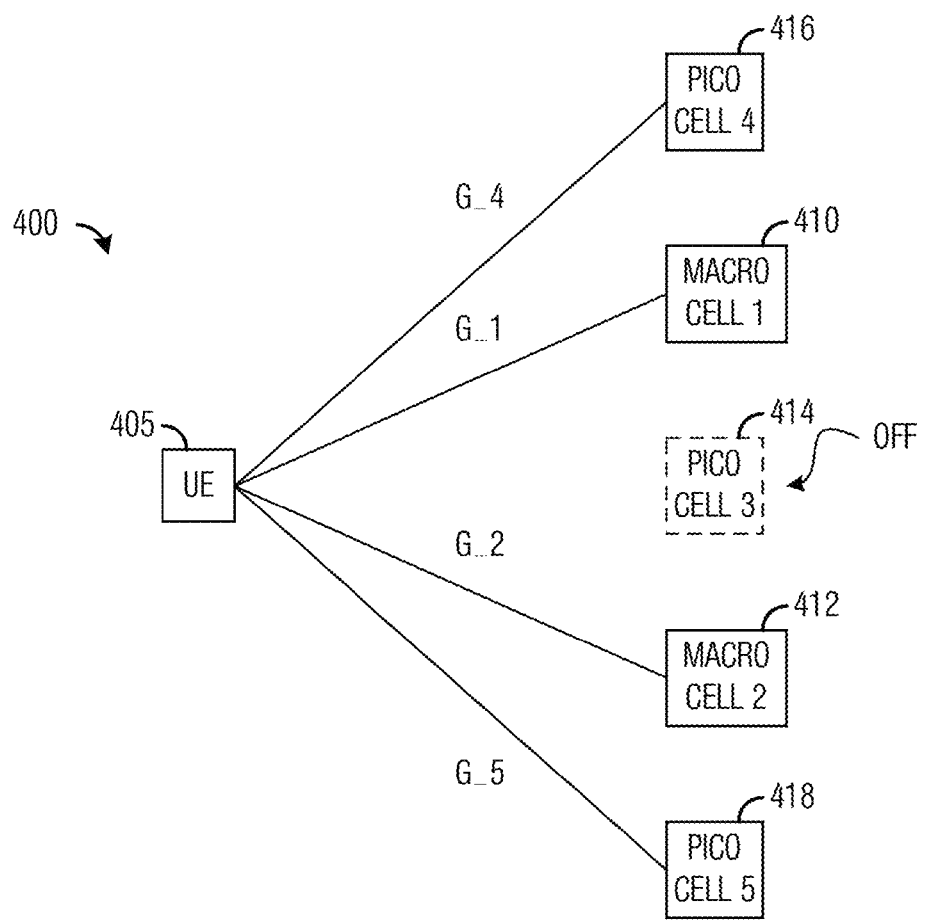

FIG. 4b illustrates an example communications system 400 where a cell has been turned off. FIG. 4b illustrates communications system 400 with pico cell 414 turned off. It is noted that with pico cell 414 turned off, utility G of remaining cells may differ from utility G of the corresponding cells in communications system 400 with pico cell 414 turned on.

Figure 5:
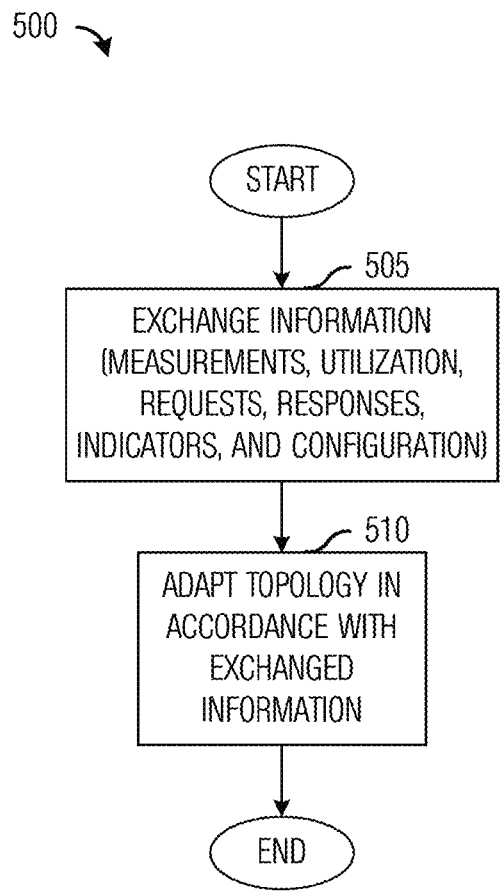
FIG. 5 illustrates a flow diagram of example operations in topology adaptation by an adaptation device according to example embodiments described herein.

FIG. 5 illustrates a flow diagram of example operations 500 in topology adaptation by an adaptation device. Operations 500 may be indicative of operations occurring in an adaptation device, such as a cell (e.g., a macro cell and/or a pico cell), a network entity, or a UE, as the adaptation device performs topology adaptation in a wireless communications system.

Operations 500 may begin with the adaptation device exchanging information with other devices in the wireless communications system (block 505). The information may include measurement information (such as SINR, signal strength measurements, channel quality measurements, interference measurements, and the like), utilization information (such as UR), requests (such as measurement information requests, SINR requests, utilization information requests, and the like), responses (such as measurement information reports, SINR reports, utilization information reports, and the like), indicators (such as adaptation indicators, request indicators, and the like), configuration information and/or indicators (such as cell lists for UEs, neighbor lists, performance measure thresholds, and the like), and the like. The information may be exchanged with other adaptation devices, cells, UEs, and the like.

The adaptation device may perform topology adaptation in accordance with the exchanged information (block 510). Discussions of example topology adaptation techniques are presented below. The adaptation device may perform topology adaptation by itself. As an example, the adaptation device may be a UE and it may select a macro cell and/or a pico cell to attach to or to handover to. The adaptation device may perform topology adaptation on another device. As an example, the adaptation device may be a cell or a network entity and it may select a macro cell and/or a pico cell of one or more UEs. As another example, the adaptation device may be a cell or a network entity and it may select a pico cell(s) to turn on or off.

Figure 6A:
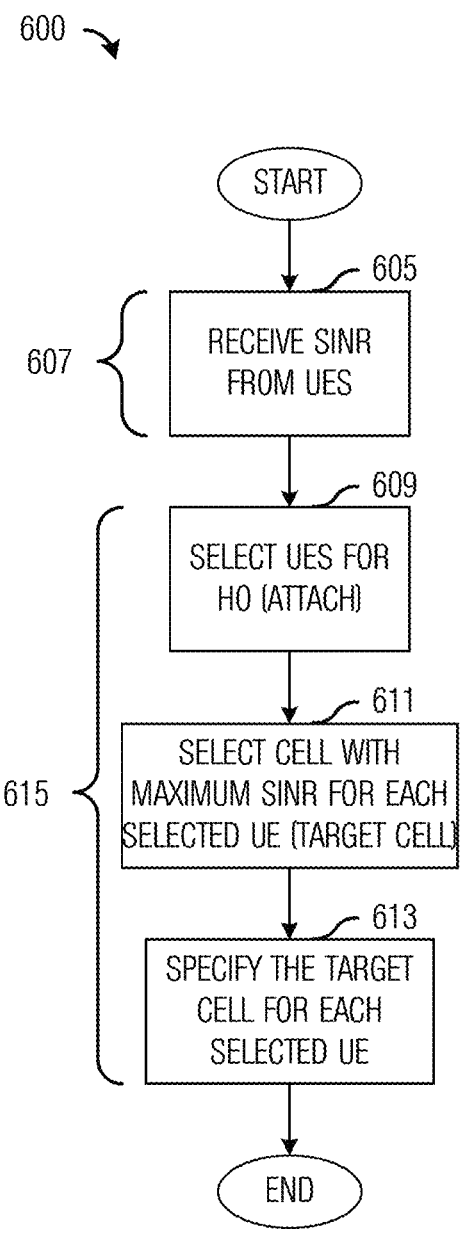
FIG. 6a illustrates a flow diagram of example operations in an adaptation device as it performs topology adaptation by selecting a cell for a UE according to a first utility according to example embodiments described herein.

FIG. 6a illustrates a flow diagram of example operations 600 in an adaptation device as it performs topology adaptation by selecting a cell for a UE according to a first utility. Operations 600 may be indicative of operations occurring in an adaptation device, such as a cell or a network entity, as the adaptation device selects a cell for a UE.

Operations 600 may begin with the adaptation device receiving SINR reports from UEs (block 605). The SINR reports may be from UEs that are operating within a coverage area of or within hearing range of the adaptation device. The SINR reports may be in response to SINR measurement requests transmitted by the adaptation device or by another device (such as a cell). Block 605 (highlighted as block 607) may be an example implementation of the adaptation device exchanging information with other devices, block 505 in FIG. 5.

The adaptation device may select a subset of UEs for topology adaptation (block 609). As an example, the adaptation device may select the subset of UEs for an adaptation instance in accordance with a selection factor, such as SINR level, UE priority, UE subscription level, service priority, UE history, and the like. In general, selecting a fraction of UEs at a time for potential adaptation rather than allowing all of the UEs for topology adaptation can help to reduce problems due to congestion, the ping pong effect, and the like. A UE not selected for the adaptation instance may be considered in another adaptation instance. The adaptation device may select a cell (either a macro cell or a pico cell) as a target cell for each UE in the subset of UEs (block 611). The selection of the cell may be made using a utility. Generally, a utility is a function that yields a number (normally a real number) to facilitate the evaluation or comparison of items. As an illustrative example, for a particular UE, the adaptation device may select a cell with maximum SINR (an example of the utility) with respect to the particular UE for the UE. As another illustrative example, the adaptation device may select a cell with maximum UE throughput (another example of the utility) for the UE. The adaptation device may signal information about the target cells to the UEs in the subset of UEs (block 613). As an example, the adaptation device may transmit a cell identifier of each UE's target cell to the UE. Collectively, blocks 609, 611, and 613 (highlighted as blocks 615) may be an example implementation of topology adaptation in accordance with the exchanged information, block 510 in FIG. 5.

Figure 6B:
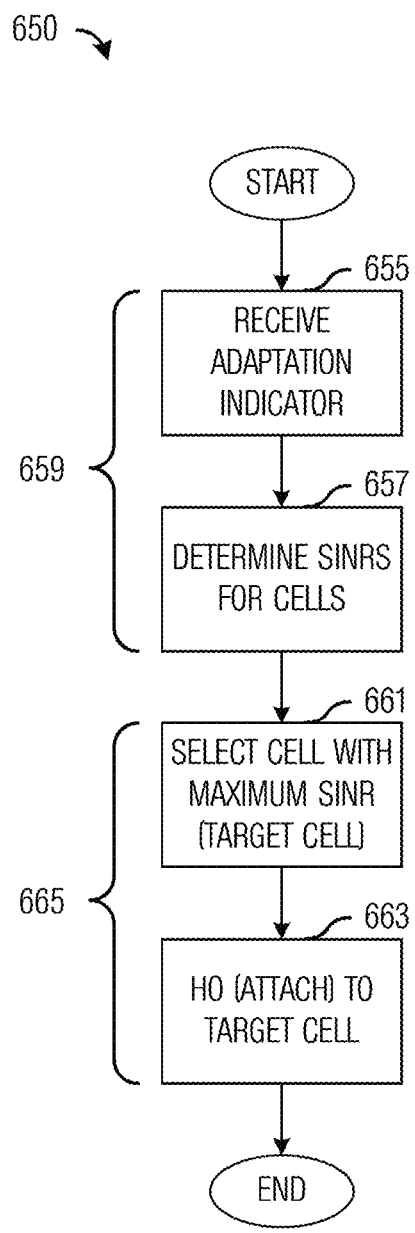
FIG. 6b illustrates a flow diagram of example operations in an adaptation device as it performs topology adaptation by selecting a cell for itself according to a first utility according to example embodiments described herein.

FIG. 6b illustrates a flow diagram of example operations 650 in an adaptation device as it performs topology adaptation by selecting a cell for itself according to a first utility. Operations 650 may be indicative of operations occurring in an adaptation device, such as a UE, as the adaptation device selects a cell for itself.

Operations 650 may begin with the adaptation device receiving an adaptation indicator (block 655). The adaptation indicator may be transmitted by a cell or a network entity and specifies that the adaptation device has been selected to perform topology adaptation. In general, the adaptation device may not perform topology adaptation until it receives the adaptation indicator. The adaptation indicator may be used by the cell or network entity to control a number of UEs participating in topology adaptation at any particular time. The adaptation device may determine SINR values for cells (block 657). As an example, the cells may be configured for use in SINR determination. As an example, adaptation device may be provided with resource information or identifiers of cells configured for use in SINR determination and the adaptation device may utilize the resource information or the identifiers of the cells to perform measurements to determine the SINR value(s). The SINR value may be derived from measurements of communications channels (such as signal strength measurements, channel quality measurements, interference measurements, and the like) between the adaptation device and each of the cells. Collectively, blocks 655 and 657 (highlighted as blocks 659) may be an example implementation of the adaptation device exchanging information with other devices, block 505 in FIG. 5.

The adaptation device may select a cell as its target cell (block 661). As an illustrative example, for a particular UE, the adaptation device may select a cell with maximum SINR of (or similarly, with respect to) the particular UE (an example of the utility) for the UE. As another illustrative example, the adaptation device may select a cell with maximum UE throughput for the UE (another example of the utility). The UE may HO or attach to the target cell (block 663). In general, the HO or attach procedures involve an exchange of messages between the adaptation device and the target cell to configure the HO or attach. Once the HO or attach is configured, the adaptation device may complete the HO or attach to the target cell. Collectively, blocks 661 and 663 (highlighted as blocks 665) may be an example implementation of topology adaptation in accordance with the exchanged information, block 510 in FIG. 5.

Figure 7A:
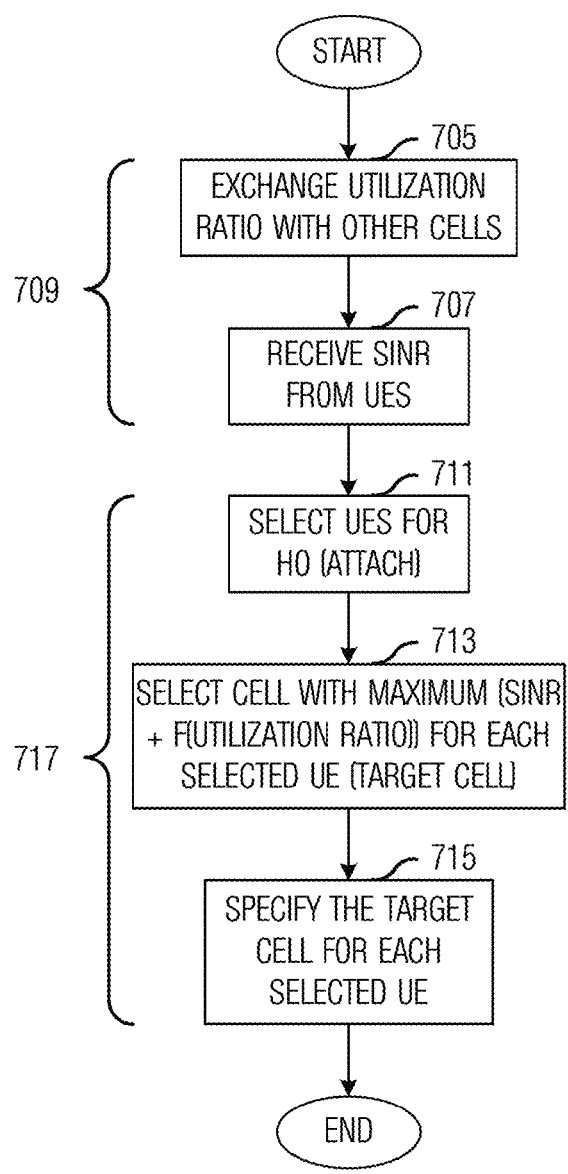
FIG. 7a illustrates a flow diagram of example operations in an adaptation device as it performs topology adaptation by selecting a cell for a UE according to a second utility according to example embodiments described herein.

FIG. 7a illustrates a flow diagram of example operations 700 in an adaptation device as it performs topology adaptation by selecting a cell for a UE according to a second utility. Operations 700 may be indicative of operations occurring in an adaptation device, such as a cell or a network entity, as the adaptation device selects a cell for a UE.

Operations 700 may begin with the adaptation device exchanging utilization information, such as UR, with other cells (block 705). The adaptation device may send its UR to other cells and receive UR from the other cells over a backhaul connection. Alternatively, the adaptation device may exchange a function of utilization information with other cells. The adaptation device may also receive SINR reports from UEs (block 707). The SINR reports may be from UEs that are operating within a coverage area of or within hearing range of the adaptation device. The SINR reports may be in response to SINR measurement requests transmitted by the adaptation device or by another device (such as a cell). Blocks 705 and 707 (highlighted as blocks 709) may be an example implementation of the adaptation device exchanging information with other devices, block 505 in FIG. 5.

The adaptation device may select a subset of UEs for topology adaptation (block 711). As an example, the adaptation device may select the subset of UEs in accordance with a selection factor, such as SINR level, UE priority, UE subscription level, service priority, UE history, and the like. In general, selecting a fraction of UEs rather than allowing all of the UEs for topology adaptation can help to reduce problems due to congestion, the ping pong effect, and the like. The adaptation device may select a cell (either a macro cell or a pico cell) as a target cell for each UE in the subset of UEs (block 713). As an illustrative example, for a particular UE, the adaptation device may select a cell with maximum of SINR with respect to the particular UE plus a function of the UR for the cell for the UE (collectively, an example of the utility). The adaptation device may signal information about the target cells to the UEs in the subset of UEs (block 715). As an example, the adaptation device may transmit a cell identifier of each UE's target cell to the UE. Collectively, blocks 711, 713, and 715 (highlighted as blocks 715) may be an example implementation of topology adaptation in accordance with the exchanged information, block 510 in FIG. 5.

Figures 7B, 7C:
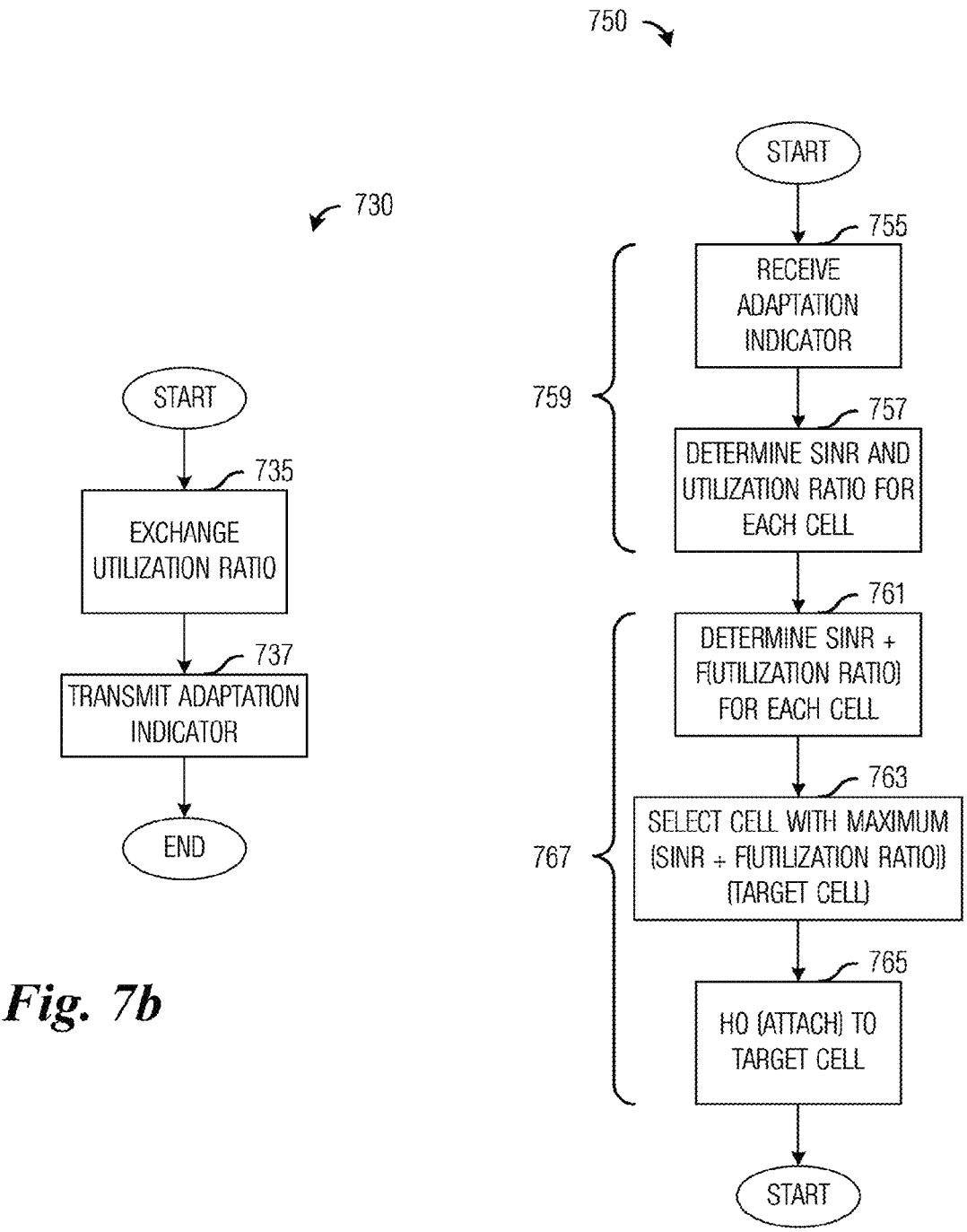
FIG. 7b illustrates a flow diagram of example operations in a cell as it participates in topology adaptation according to example embodiments described herein.
FIG. 7c illustrates a flow diagram of example operations in an adaptation device as it performs topology adaptation by selecting a cell for itself according to a second utility according to example embodiments described herein.

FIG. 7b illustrates a flow diagram of example operations 730 in a cell as it participates in topology adaptation. Operations 730 may be indicative of operations occurring in a cell, such as a macro cell or a pico cell, as the cell participates in topology adaptation.

Operations 730 may begin with the cell exchanging utilization information (e.g., UR) to other cells (block 735). The cell may exchange UR or a function of UR with other cells. The cell may transmit adaptation indicators to UEs selected to perform topology adaptation (block 737).

FIG. 7c illustrates a flow diagram of example operations 750 in an adaptation device as it performs topology adaptation by selecting a cell for itself according to a second utility. Operations 750 may be indicative of operations occurring in an adaptation device, such as a UE, as the adaptation device selects a cell for itself.

Operations 750 may begin with the adaptation device receiving an adaptation indicator (block 755). The adaptation indicator may be transmitted by a cell or a network entity and specifies that the adaptation device has been selected to perform topology adaptation. In general, the adaptation device may not perform topology adaptation until it receives the adaptation indicator. The adaptation indicator may be used by the cell or network entity to control a number of UEs participating in topology adaptation at any particular time. The adaptation device may determine SINR values and URs for cells (block 757). As an example, the cells may be configured for use in SINR determination. As an example, adaptation device may be provided with resource information or identifiers of cells configured for use in SINR determination and the adaptation device may utilize the resource information or the identifiers of the cells to perform measurements to determine the SINR value(s). The SINR value may be derived from measurements of communications channels (such as signal strength measurements, channel quality measurements, interference measurements, and the like) between the adaptation device and each of the cells. The URs may be provided by the cells themselves or the URs may be retrieved from a centralized or distributed database. Collectively, blocks 755 and 757 (highlighted as blocks 759) may be an example implementation of the adaptation device exchanging information with other devices, block 505 in FIG. 5.

Figure 7D:
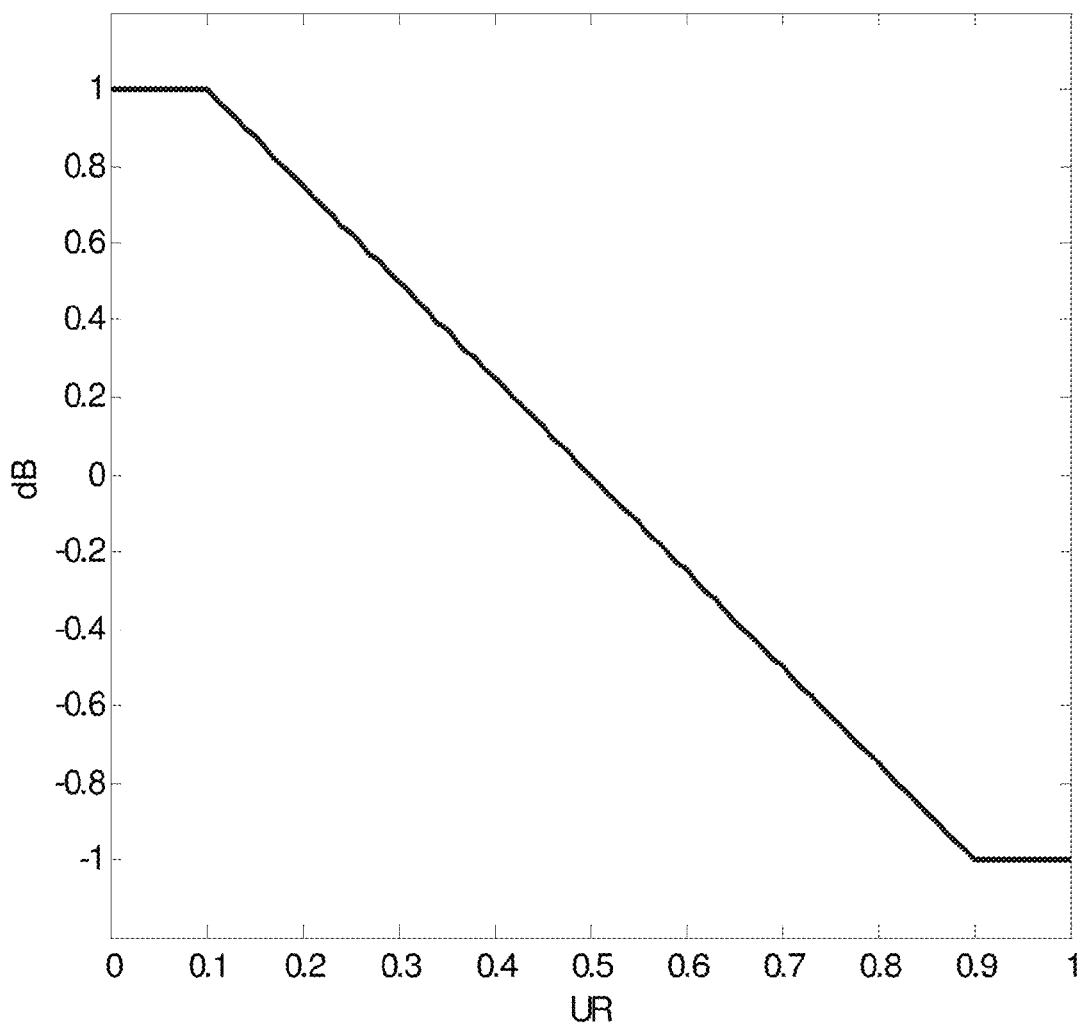
FIG. 7d illustrates a data plot of an example relationship between UR and the bias in dB according to example embodiments described herein.

The adaptation device may determine a SINR for a cell plus a function of the UR for the cell (block 761). As an example, the adaptation device may add the SINR for the cell and a value, e.g. a bias or offset, which may correspond to the UR for the cell. FIG. 7d illustrates a data plot of an example relationship between UR and the bias in dB. Referring back now to FIG. 7c, the adaptation device may select a cell as its target cell (block 763). As an illustrative example, for a particular UE, the adaptation device may select a cell with maximum (SINR plus function of UR) with respect to the particular UE (an example of the utility) for the UE. The UE may HO or attach to the target cell (block 765). In general, the HO or attach procedures involve an exchange of messages between the adaptation device and the target cell to configure the HO or attach. Once the HO or attach is configured, the adaptation device may complete the HO or attach to the target cell. Collectively, blocks 761, 763, and 765 (highlighted as blocks 767) may be an example implementation of topology adaptation in accordance with the exchanged information, block 510 in FIG. 5.

Figure 8:
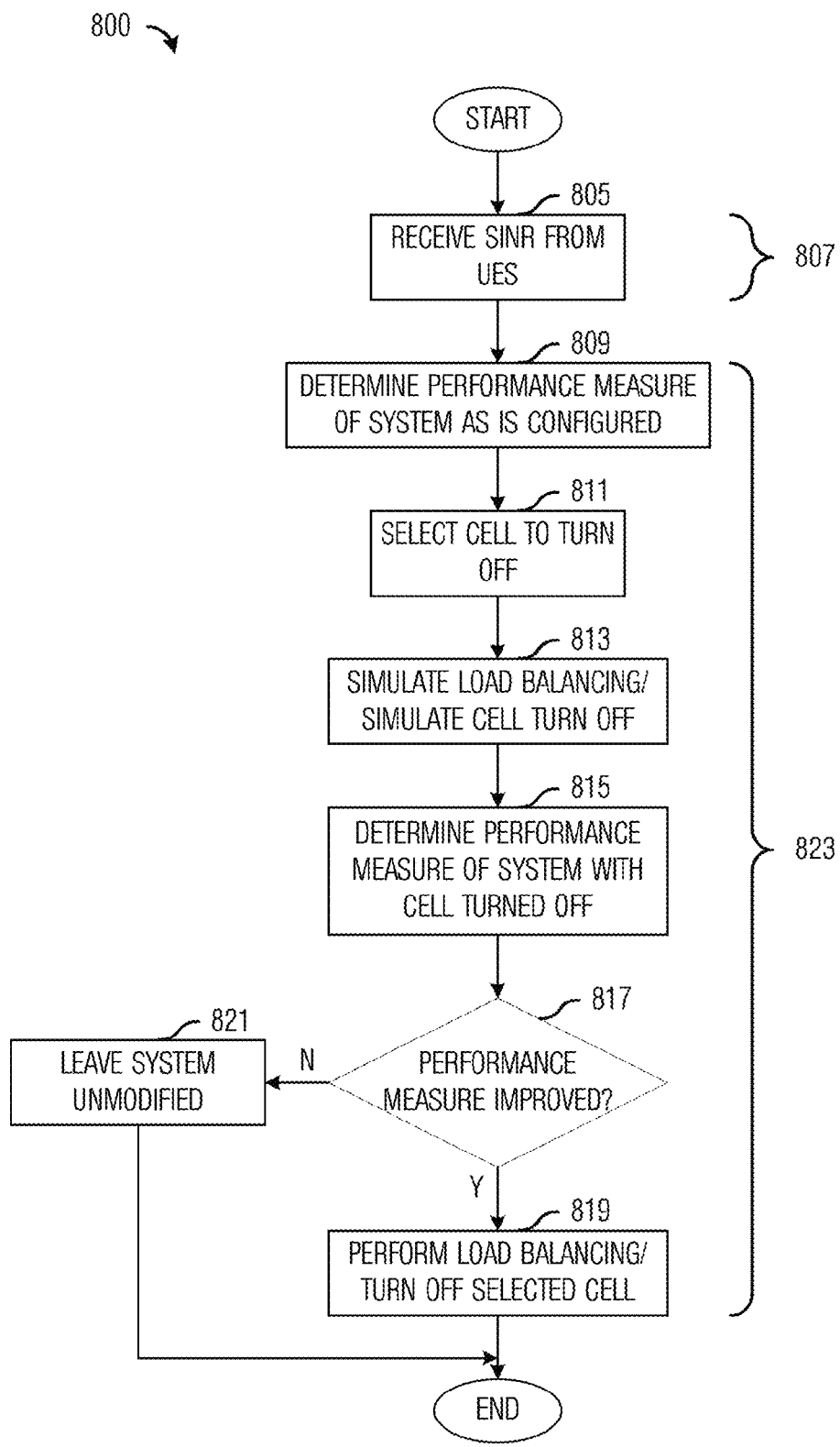
FIG. 8 illustrates a flow diagram of example operations in an adaptation device as it performs topology adaptation by selecting a cell to turn on or off according to example embodiments described herein.

FIG. 8 illustrates a flow diagram of example operations 800 in an adaptation device as it performs topology adaptation by selecting a cell to turn on or off. Operations 800 may be indicative of operations occurring in an adaptation device, such as a cell or a network entity, as the adaptation device performs topology adaptation by turning a cell(s) on or off.

Operations 800 may begin with the adaptation station receiving SINR reports from UEs (block 805). The SINR reports may be from UEs that are operating within a coverage area of or within hearing range of the adaptation device. The SINR reports may be in response to SINR measurement requests transmitted by the adaptation device or by another device (such as a cell). Block 805 (highlighted as block 807) may be an example implementation of the adaptation device exchanging information with other devices, block 505 in FIG. 5.

The adaptation device may determine a performance measure of the wireless communications system (block 809). The performance measure may provide a value(s) that serves as an indication of the performance of the wireless communications system. Examples of performance measures include sum UE SINR, sum UE throughput, sum cell throughput, sum UE latency, sum cell latency, UE queue length, cell queue length, buffer status at UE and/or cell, UE packet insertion time, cell packet insertion time, and the like. As an example, if sum UE SINR is used, an example performance measure may be expressed as $$G_i = \Sigma_{k=1}^{K} \alpha_{ik} \gamma_{ik} + \Sigma_{j \in \mathbb{Q}_i} \Sigma_{k=1}^{K} \alpha_{jk} \gamma_{jk},$$

where $\mathbb{Q}_i$ denotes an index set of cell i's m nearest neighbor cells. The adaptation device may select a cell, e.g., a pico cell, to turn off (block 811). The adaptation device may select the cell in accordance with an adaptation criterion, which may include cell queue length, number of UEs served by the cell, proximity to other cells, availability of other cells to accept the cell's UEs, service history, random selection, and the like.

The adaptation device may simulate load balancing by moving UEs served by the cell to other cells (block 813). As an example, the adaptation device may hypothetically move UEs served by the cells to cells that are closely located to the cell, lightly loaded cells that are closely located to the cell, cells that are detectable by the UEs, and the like. The adaptation device may also simulate turning off the cell (block 813). It is noted that the adaptation device does not actually move the UEs of the cell to other cells, nor does it actually turn off the cell. In other words, the adaptation device may simulate the impact of turning off the cell on the wireless communications system by hypothetically moving the UEs served by the cell to other cells and then "turning off" the cell.

The adaptation device may determine another performance measure of the wireless communications system with the cell turned off and the UEs served by the cell moved to other cells (block 815). In other words, the adaptation device simulates the load balancing that is typically necessary when a cell is turned off and then re-evaluates the performance measure of the wireless communications system as if the load balancing and the turning off of the cell actually took place.

The adaptation device may perform a check to determine if the performance of the wireless communications system improved as a result of turning off the cell (block 817). As an example, the adaptation device may compare the performance measure of the wireless communications system as it was configured (block 809) to the performance measure of the wireless communications system with the simulated load balancing and the cell turn off (block 817). If the performance measure of the wireless communications system as it was configured is less than the performance measure of the wireless communications system with the simulated load balancing and the cell turn off by more than a threshold, the adaptation device may determine that the performance of the wireless communications system has improved. Therefore, the adaptation device may perform an actual load balancing for UEs of the cell and actually turn off the cell (block 819). If the performance of the wireless communications system did not improve or actually decreased, the adaptation device may leave the wireless communications system unmodified (block 821). Collectively, blocks 809-821 (highlighted as blocks 823) may be an example implementation of the adaptation device exchanging information with other devices, block 505 in FIG. 5.

Although the discussion of FIG. 8 focuses on turning a cell off, the adaptation device may also turn a cell on. In general, operations 800 may be used to switch the state of a cell, i.e., from on to off or from off to on, or a carrier of a cell to turn on or off, or adapt the transmit power level(s) of the cell, etc. Furthermore, operations 800 may be repeated in an iterative manner to test the effect of turning off (or turning on) of a plurality of cells.

Additionally, operations 800 may be performed in a distributed manner, with a single adaptation device testing the impact of turning off (or turning on) cells operating within a local area of the wireless communications system. Distributed operation for small areas of the wireless communications system may help to reduce computational overhead since load balancing is performed for a small number of cells rather than all of the cells within the wireless communications system. Similar reductions in communications overhead may also be realized.

The turning off (or turning on) of cells, i.e., cell state switch, may result in a ping pong situation wherein the adaptation device turns off a cell in a first iteration and then turning it back on in a subsequent iteration, and vice versa. A similar situation may result in a ping pong situation with two or more adjacent cells, with one cell being turned off and its neighbor being turned on and then later, the cell being turned on and its neighbor being turned off, and vice versa.

Scheduling may be used to avoid neighboring adaptation devices from making on/off decisions at the same time, e.g., when a first adaptation device is making on/off decisions, its neighboring adaptation device(s) will not. However, adaptation devices that are remotely located may be allowed to make on/off decisions simultaneously or near simultaneously to help improve efficiency. As an example, a coloring algorithm may be used to select which adaptation devices may perform on/off decision making simultaneously.

Figures 9A, 9B:
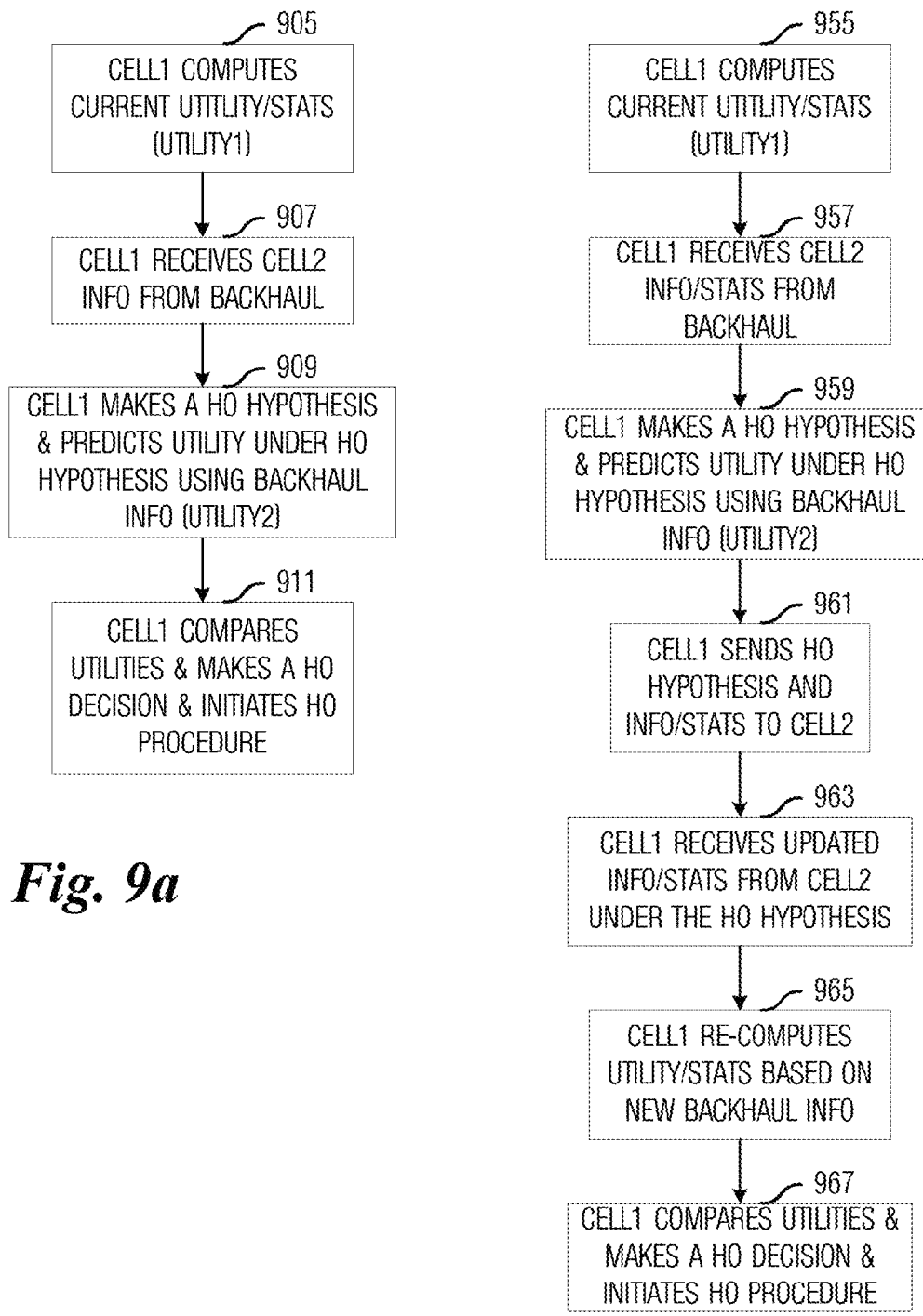
FIG. 9a illustrates a flow diagram of example operations occurring in an adaptation device as the adaptation device performs a HO according to example embodiments described herein.
FIG. 9b illustrates a flow diagram of example operations occurring in an adaptation device as the adaptation device performs a HO with consideration being given to UR according to example embodiments described herein.

FIG. 9a illustrates a flow diagram of example operations 900 occurring in an adaptation device as the adaptation device performs a HO. Operations 900 may be indicative of operations occurring in an adaptation device, such as a cell, a network entity, or a UE, as the adaptation device performs a HO.

Operations 900 may begin with the adaptation device evaluating a utility (block 905). The adaptation device may evaluate the utility to select a cell as a target cell. The utility may produce a numeric value from an input(s), such as SINR. The adaptation device may receive information from a cell (block 907). The information from the cell may include information needed to initiate and/or complete the HO to the cell. The information may also include status information about the cell, such as its UE load, queue length, and the like. The adaptation device may make a hypothesis that it performs the HO and re-evaluates the utility in accordance with parameters of the hypothesis and the information received from the cell (block 909). The adaptation device may compare the values of the utility and may decide whether or not to actually perform the HO (block 911). As shown in FIG. 9a, the adaptation device decides to perform the HO in accordance with the compared values of the utility. Although the discussion focuses on a HO, operations 900 (as well as others discussed herein may also be operable with attachment).

FIG. 9b illustrates a flow diagram of example operations 950 occurring in an adaptation device as the adaptation device performs a HO with consideration being given to UR. Operations 950 may be indicative of operations occurring in an adaptation device, such as a cell, a network entity, or a UE, as the adaptation device performs a HO.

Operations 900 may begin with the adaptation device evaluating a utility (block 955). The adaptation device may evaluate the utility to select a cell as a target cell. The utility may produce a numeric value from an input(s), such as SINR. The adaptation device may receive information from a cell (block 957). The information from the cell may include information needed to initiate and/or complete the HO to the cell. The information may also include status information about the cell, such as its UE load, queue length, and the like. The adaptation device may make a hypothesis that it performs the HO and re-evaluates the utility in accordance with parameters of the hypothesis and the information received from the cell (block 959). The adaptation device may send the hypothesis as well as relevant information to the cell (block 961). The adaptation device may receive updated information from the cell, where the updated information is due to the hypothesis and relevant information from the adaptation device (block 963). The adaptation may update the utility in accordance with the updated information from the cell (block 965). The adaptation device may compare the values of the utility and may decide whether or not to actually perform the HO (block 967). As shown in FIG. 9a, the adaptation device decides to perform the HO in accordance with the compared values of the utility.

Figure 10A:
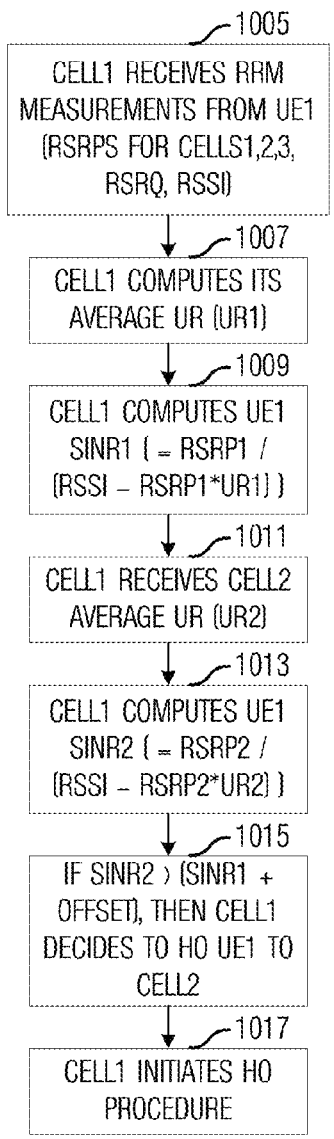
FIG. 10a illustrates a flow diagram of example operations occurring in an adaptation device as it performs a HO using maximum SINR to select a target cell according to example embodiments described herein.

FIG. 10a illustrates a flow diagram of example operations 1000 occurring in an adaptation device as it performs a HO using maximum SINR to select a target cell. Operations 1000 may be indicative of operations occurring in an adaptation device, such as a cell, a network entity, or a UE, as the adaptation device performs a HO.

Operations 1000 may begin with the adaptation device receiving radio resource management (RRM) reports from a UE (block 1005). The RRM reports may include measurements of reference signals transmitted by cells detectable by the UE, for example. The RRM reports may include reference signal received power (RSRP) reports, received signal strength indicators (RSSI), and the like. The adaptation device may determine its $UR_1$, e.g., its average UR (block 1007). The adaptation device may determine a SINR for the UE as related to the adaptation device (block 1009). As an example, the SINR for the UE may be estimated or emulated using an equation expressed as $SINR=RSRP/(RSSI-RSRP*UR_1)$; it is noted that scaling and/or normalization of RSRP and/or RSSI may be needed for this equation. The adaptation device may receive a $UR_2$ from a cell (block 1011). The adaptation device may determine a SINR for the UE as related to the cell (block 1013). As an example, the SINR for the UE may be estimated or emulated using an equation expressed as $SINR=RSRP/RSSI-RSRP*UR_2$. Depending on the respective SINR values, the adaptation device may decide to have the UE HO to the cell or remain with the adaptation device (block 1015). If the adaptation device decides to have the HO to the cell, the adaptation device may initiate a HO (block 1017).

As an alternative to the use of SINR estimation or emulation, it may be possible to utilize common reference signal (CRS) SINR or interference measurements for RRM to determine SINR. In such a situation, a UE may detect a CRS from serving cells and/or neighboring cells and subtracts the detected CRS from received signals, which it may use to obtain interference information. However, the obtained interference information may only reflect the interference condition on CRS resource elements (REs) and may not accurately reflect the interference condition on data REs. To estimate the data RE interference condition, the UE may utilize the available measurement of RSSI and RSRP as well as UR estimate, based on the approximate relation of I=RSSI−RSRP*UR where the RSRP and UR are associated with a cell. The UE may determine SINR from the interference information. As another alternative to the use of SINR estimation or emulation, it may be possible to use RRM interference measurement resources (IMR) to determine SINR. RRM-IMR may be similar to channel state information (CSI)-IMR but is configured to be cell specific (or at least UE-group specific) rather than UE specific. In more detail, the communications system may coordinate sets of RRM-IMR, each set being associated with one type of interference condition, such as a cell in the coordination set mutes on a RRM-IMR. It is noted that on RRM-IMR, the serving cell may not transmit any signal, so all that are received may be associated with interference. In legacy systems, no RRM-IMR was used and hence the UE can measure only one interference condition (by subtracting serving cell signal). With multiple sets of RRM-IMR, multiple interference conditions can be measured, and multiple RRM measurements (e.g. RSRQ/SINR) can be obtained by the communications system to perform advanced cell selection, load shifting and/or balancing, on-off transitions, and the like.

Figure 10B:
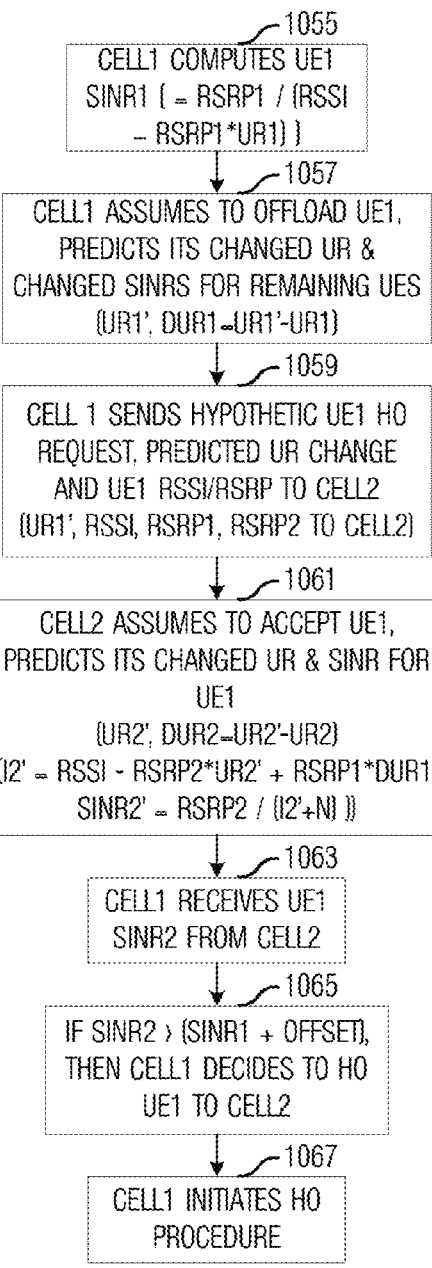
FIG. 10b illustrates a flow diagram of example operations occurring in an adaptation device as the adaptation device performs a HO using maximum SINR to select a target cell with consideration being given to UR according to example embodiments described herein.

FIG. 10b illustrates a flow diagram of example operations 1050 occurring in an adaptation device as the adaptation device performs a HO using maximum SINR to select a target cell with consideration being given to UR. Operations 1050 may be indicative of operations occurring in an adaptation device, such as a cell, a network entity, or a UE, as the adaptation device performs a HO. Compared to operations 1000 of FIG. 10a, operation 1050 considers the changes of UR due to HO.

Operations 1050 may begin with the adaptation device determining a SINR for a UE as related to the adaptation device (block 1055). The adaptation device may simulate that the UE is HO to another cell and determines it's new UR and changed SINR for other UEs served by the adaptation device (block 1057). In other words, the adaptation device may make a hypothesis regarding the HO of the UE. The adaptation device may provide information about the hypothesis to the cell (block 1059). As an example, the information may include predicted changes to UR, the UE's RSSI and/or RSRP to the cell. It may be assumed that the cell accepts the information (block 1061). The adaptation device may receive a SINR value for the UE as related to the cell from the cell (block 1063). The adaptation device may compare the SINR value for the UE as received from the cell with its own SINR value for the UE plus an offset (e.g., a function of UR) to determine if it should perform the HO for the UE (block 1065). If the adaptation device decides to perform the HO, it may initiate a HO procedure (block 1067).

Figure 10C:
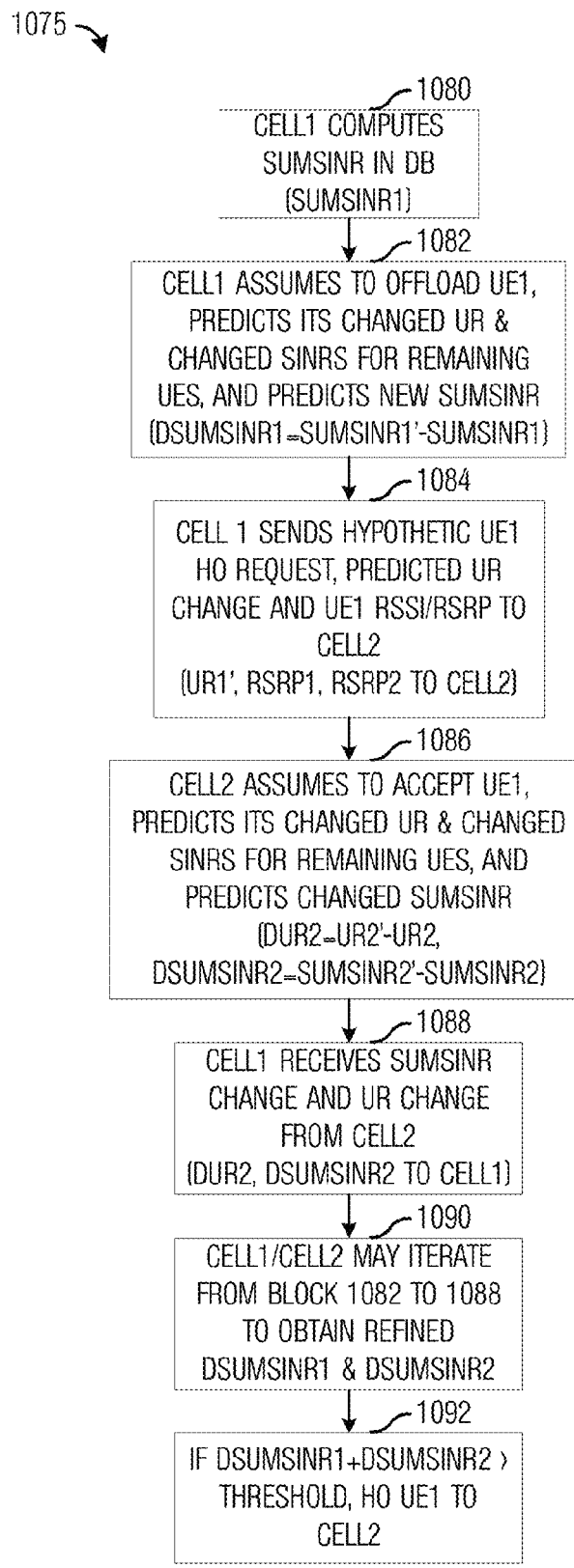
FIG. 10c illustrates a flow diagram of example operations occurring in an adaptation device as the adaptation device performs a HO using maximum sum SINR to select a target cell with consideration being given to UR according to example embodiments described herein.

FIG. 10c illustrates a flow diagram of example operations 1075 occurring in an adaptation device as the adaptation device performs a HO using maximum sum SINR (or maximum weighted sum SINR) to select a target cell with consideration being given to UR. Operations 1075 may be indicative of operations occurring in an adaptation device, such as a cell, a network entity, or a UE, as the adaptation device performs a HO. Compared to operations 1050 of FIG. 10a, operation 1075 considers the changes of multiple UEs/cells' utilities due to HO.

Operations 1075 may begin with the adaptation device determining a sum SINR for the UEs that it is serving (block 1080). The adaptation device may make a hypothesis of a HO for a UE (block 1082). The adaptation device may predict the change to it's UR and changed SINRs for remaining UEs as impacted by the HO of the UE to another cell. The adaptation device may re-determine a sum SINR based on the hypothesis. The adaptation device may send information regarding the hypothesis to the cell (block 1084). As an example, the information may include predicted changes to UR, the UE's RSSI and/or RSRP to the cell. It may be assumed that the cell accepts the information (block 1086). The adaptation device may receive a sum SINR as changed by the hypothesis, as well as a changed UR (block 1088). The adaptation device and the cell may iterate from block 1082 to block 1088 to refine the sum SINRs (block 1090). The adaptation device may perform a check to determine if a combination of the sum SINRs exceed a threshold (block 1092). If the combination of the sum SINRs exceeds the threshold, the adaptation device may initiate a HO for the UE to move it to the cell.

Figures 11A, 11B:
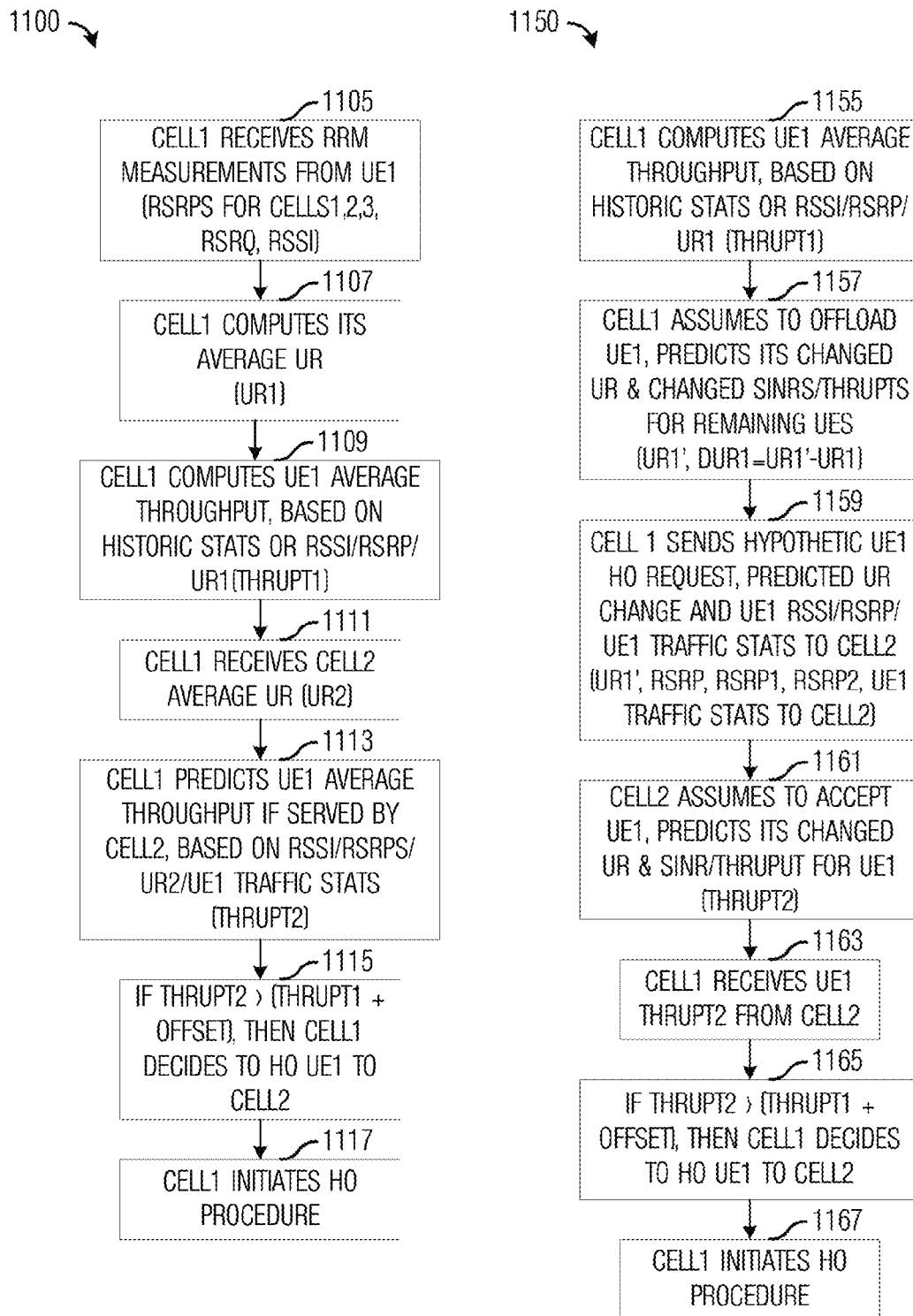
FIG. 11a illustrates a flow diagram of example operations occurring in an adaptation device as it performs a HO using maximum throughput to select a target cell according to example embodiments described herein.
FIG. 11b illustrates a flow diagram of example operations occurring in an adaptation device as the adaptation device performs a HO using maximum throughput to select a target cell with consideration being given to UR according to example embodiments described herein.

FIG. 11a illustrates a flow diagram of example operations 1100 occurring in an adaptation device as it performs a HO using maximum throughput to select a target cell. Operations 1100 may be indicative of operations occurring in an adaptation device, such as a cell, a network entity, or a UE, as the adaptation device performs a HO.

Operations 1100 may begin with the adaptation device receiving radio resource management (RRM) reports from a UE (block 1105). The RRM reports may include measurements of reference signals transmitted by cells detectable by the UE, for example. The RRM reports may include reference signal received power (RSRP) reports, received signal strength indicators (RSSI), and the like. The adaptation device may determine its $UR_1$, e.g., its average UR (block 1107). The adaptation device may determine an average throughput for the UE as related to the adaptation device (block 1109). The average throughput may be determined based on RSSI, RSRP, UR, and the like, as well as traffic statistics and historical information. The adaptation device may receive a $UR_2$ from a cell (block 1111). The adaptation device may predict an average throughput for the UE as related to the cell (block 1113). As an example, the average throughput for the UE may be based on RSSI, RSRP, UR, traffic statistics, historical information, and the like. Depending on the respective average throughput values, the adaptation device may decide to have the UE HO to the cell or remain with the adaptation device (block 1115). If the adaptation device decides to have the HO to the cell, the adaptation device may initiate a HO (block 1117).

FIG. 11b illustrates a flow diagram of example operations 1150 occurring in an adaptation device as the adaptation device performs a HO using maximum throughput to select a target cell with consideration being given to UR. Operations 1150 may be indicative of operations occurring in an adaptation device, such as a cell, a network entity, or a UE, as the adaptation device performs a HO.

Operations 1150 may begin with the adaptation device determining an average throughput for a UE as related to the adaptation device (block 1155). The adaptation device may simulate that the UE is HO to another cell and determines it's new UR and changed average throughput for other UEs served by the adaptation device (block 1157). In other words, the adaptation device may make a hypothesis regarding the HO of the UE. The adaptation device may provide information about the hypothesis to the cell (block 1159). As an example, the information may include predicted changes to UR, the UE's RSSI and/or RSRP to the cell. It may be assumed that the cell accepts the information (block 1161). The adaptation device may receive an average throughput value for the UE as related to the cell from the cell (block 1163). The adaptation device may compare the average throughput value for the UE as received from the cell with its own average throughput value for the UE plus an offset (e.g., a function of UR) to determine if it should perform the HO for the UE (block 1165). If the adaptation device decides to perform the HO, it may initiate a HO procedure (block 1167).

Figure 11C:
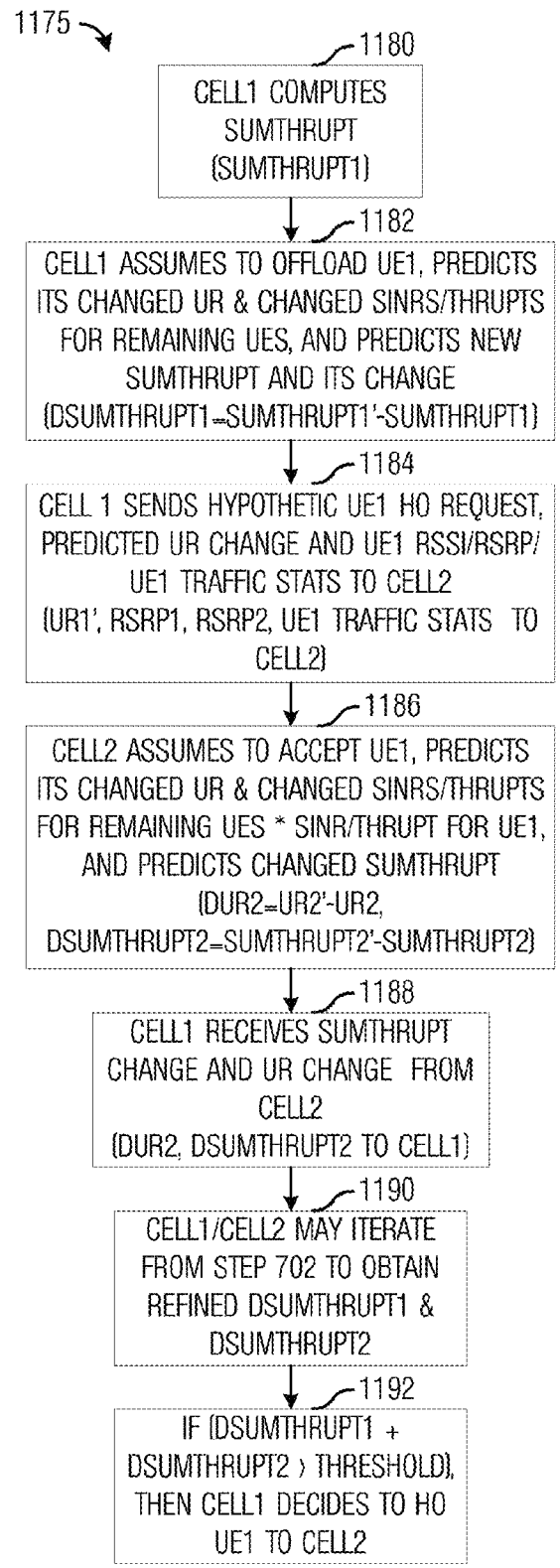
FIG. 11c illustrates a flow diagram of example operations occurring in an adaptation device as the adaptation device performs a HO using maximum sum throughput to select a target cell with consideration being given to UR according to example embodiments described herein.

FIG. 11c illustrates a flow diagram of example operations 1175 occurring in an adaptation device as the adaptation device performs a HO using maximum sum throughput to select a target cell with consideration being given to UR. Operations 1175 may be indicative of operations occurring in an adaptation device, such as a cell, a network entity, or a UE, as the adaptation device performs a HO.

Operations 1175 may begin with the adaptation device determining a sum throughput for the UEs that it is serving (block 1180). The adaptation device may make a hypothesis a HO for a UE (block 1182). The adaptation device may predict the change to it's UR and changed throughputs for remaining UEs as impacted by the HO of the UE to another cell. The adaptation device may re-determine a sum throughput based on the hypothesis. The adaptation device may send information regarding the hypothesis to the cell (block 1184). As an example, the information may include predicted changes to UR, the UE's RSSI and/or RSRP to the cell. It may be assumed that the cell accepts the information (block 1186). The adaptation device may receive a sum throughput as changed by the hypothesis, as well as a changed UR (block 1188). The adaptation device and the cell may iterate from block 1182 to block 1188 to refine the sum SINRs (block 1190). The adaptation device may perform a check to determine if a combination of the sum throughputs exceed a threshold (block 1192). If the combination of the sum throughputs exceeds the threshold, the adaptation device may initiate a HO for the UE to move it to the cell.

In practice, the macro layer and/or the pico layer may each have multiple carriers in different carrier frequencies. In such a situation, a question may arise about how to define a neighborhood for each active carrier of a cell, which may be used in the exchange and optimization of backhaul information. The following discussion focuses on the pico layer.

According to an example embodiment, orthogonal reuse may be used for the different K carrier frequencies. In general, some of the K carrier frequencies of each cell may be turned on and others may be turned off. When a decision is to be made regarding the state of the carriers of a cell, the state of the cell's neighbor cells carriers are also considered. As an illustrative example, if a closely located neighboring cell's carrier 1 is on and carrier 2 is off, then the cell's carrier 1 may be turned off while carrier 2 may be turned on. The resulting neighborhood structure may be provided to topology adaptation techniques as described herein.

According to an example embodiment, multiple stages of backhaul information exchanges may take place. As an illustrative example, in a first stage backhaul information exchange, inter-cell distance, pathloss, and/or functions of either or both, for neighboring cells may be exchanged. In a second or subsequent stage backhaul information exchange, information about current layer selections of the neighboring cells may be exchanged. The information about the current layer selections may be used to modify the backhaul information exchanged in the first stage backhaul information exchange with consideration being given for the cell's own layer selection. In accordance with the backhaul information, a cell may be able to make a decision on which layer to select for a next iteration. Other techniques, such as progressive point adding, and the like, may also use the backhaul information. Alternatively, a centralized network entity may receive the backhaul information, make topology adaptations, and pass information about the backhaul, as well as the topology adaptations, to the cells. Progressive point adding is a generic technique to add a to-be-decided point (e.g., a node, a cell, and the like) into one of multiple layers based on certain criteria. As an example, the to-be-decided point may calculate the minimum pathloss to its neighboring points in each of the K layers and obtain K minimum pathloss values, and then decide to join the k-th layer which has the largest minimum pathloss value. By doing so, undecided neighboring points can be progressively added to the K layers.

According to an example embodiment, cells at the same layer (with exception of a single receiving cell in each iteration) may follow a specified schedule and/or pattern (which may be specified by an operator of the communications system, a technical standard, and the like) to broadcast a same signal with a same transmit power level on a same resource. The signals may combine over the air. Cells utilizing a different layer may perform a similar operation with a different signal at a different transmit power level on a different resource. The signals may be used by the receiving cell to perform layer selection in a subsequent iteration.

Figure 12:
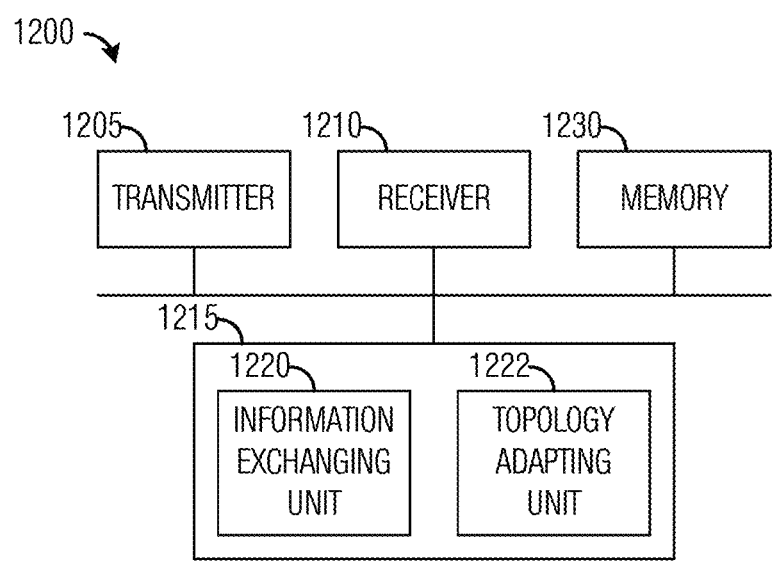
FIG. 12 illustrates an example communications device according to example embodiments described herein.

FIG. 12 illustrates an example communications device 1200. Communications device 1200 may be an implementation of an adaptation device, such as a cell, a network entity, a UE, and the like. Communications device 1200 may be used to implement various ones of the embodiments discussed herein. As shown in FIG. 12, a transmitter 1205 is configured to transmit requests, measurements, utilization information, indicators, configurations, and the like. Communications device 1200 also includes a receiver 1210 that is configured to receive requests, measurements, utilization information, indicators, configurations, and the like.

An information exchanging unit 1220 is configured to exchange information used in topology adaptation. Information exchanging unit 1220 is configured to exchange a request with a UE to have the UE report SINR for a channel between the UE and a cell. Information exchanging unit 1220 is configured to exchange the SINR report. Information exchanging unit 1220 is configured to exchange utilization information, such as UR. Information exchanging unit 1220 is configured to exchange indicators, such as adaptation indicators. Information exchanging unit 1220 is configured to exchange configuration information, such as configuration changes in accordance with a hypothesis, simulated load balancing, simulated cell state switch, and the like. A topology adapting unit 1222 is configured to adapt the topology of a wireless communications system in accordance with the information exchanged by information exchanging unit 1220. Topology adapting unit 1222 is configured to select a cell for a UE so that the UE can attach to the cell or HO to the cell. Topology adapting unit 1222 is configured to select the cell in accordance with a utility, such as SINR, SINR plus a function of UR, throughput, sum throughput, and the like. Topology adapting unit 1222 is configured to select a cell to turn on or off to help improve overall wireless communications system performance. A memory 1230 is configured to store requests, measurements, SINR reports, SINR values, indicators, configuration information, hypotheses, and the like.

The elements of communications device 1200 may be implemented as specific hardware logic blocks. In an alternative, the elements of communications device 1200 may be implemented as software executing in a processor, controller, application specific integrated circuit, or so on. In yet another alternative, the elements of communications device 1200 may be implemented as a combination of software and/or hardware.

As an example, receiver 1210 and transmitter 1205 may be implemented as a specific hardware block, while information exchanging unit 1220 and topology adapting unit 1222 may be software modules executing in a microprocessor (such as processor 1215) or a custom circuit or a custom compiled logic array of a field programmable logic array. Information exchanging unit 1220 and topology adapting unit 1222 may be modules stored in memory 1230.

Figure 13A:
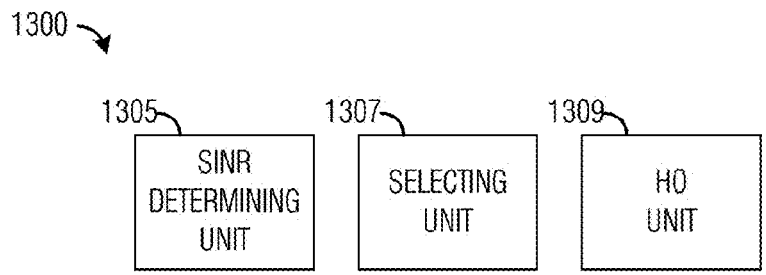
FIG. 13a illustrates a diagram of an example topology adapting unit configured for cell selection in accordance with SINR according to example embodiments described herein.

FIG. 13a illustrates a diagram of an example topology adapting unit 1300 configured for cell selection in accordance with SINR. Topology adapting unit 1300 may be an example implementation of topology adapting unit 1222 of FIG. 12. Topology adapting unit 1300 includes a SINR determining unit 1305 configured to derive SINR values from measurements of communications channels or decode SINR values from SINR reports. A selecting unit 1307 is configured to select a cell for a UE in accordance with the cell's SINR value. Selecting unit 1307 is configured to select a cell associated with a maximum SINR. If there are several cells with equal or substantially equal SINR, selecting unit 1307 may select one at random or choose a cell with minimum load or traffic, maximum data rate, and the like. A HO unit 1309 is configured to initiate and/or complete a HO for the UE. HO unit 1309 is configured to initiate and/or complete an attachment for the UE.

Figure 13B:
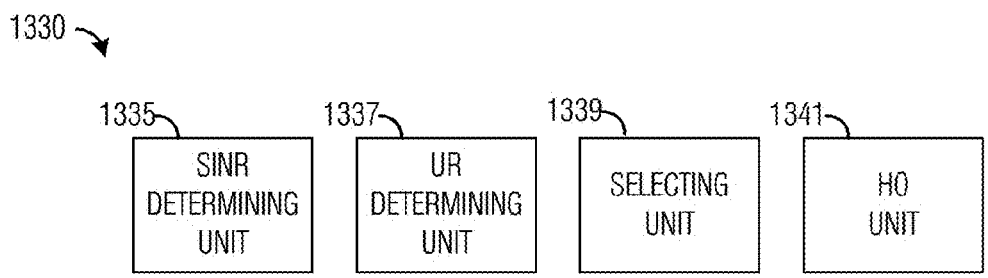
FIG. 13b illustrates diagram of an example topology adapting unit configured for cell selection in accordance with SINR and UR according to example embodiments described herein.

FIG. 13b illustrates a diagram of an example topology adapting unit 1330 configured for cell selection in accordance with SINR and UR. Topology adapting unit 1330 may be an example implementation of topology adapting unit 1222 of FIG. 12. Topology adapting unit 1330 includes a SINR determining unit 1335 configured to derive SINR values from measurements of communications channels or decode SINR values from SINR reports. A UR determining unit 1337 is configured to determine a value of a function of a UR for the cell. UR determining unit 1337 is configured to utilize a function, such as shown in FIG. 7d. A selecting unit 1339 is configured to select a cell for a UE in accordance with the cell's SINR value plus the value of the function of the cell's UR. Selecting unit 1339 is configured to select a cell associated with a maximum SINR plus the value of the function of the UR. If there are several cells with equal or substantially equal SINR plus the value of the function of the UR, selecting unit 1339 may select one at random or choose a cell with minimum load or traffic, maximum data rate, and the like. A HO unit 1341 is configured to initiate and/or complete a HO for the UE. HO unit 1341 is configured to initiate and/or complete an attachment for the UE.

Figure 13C:
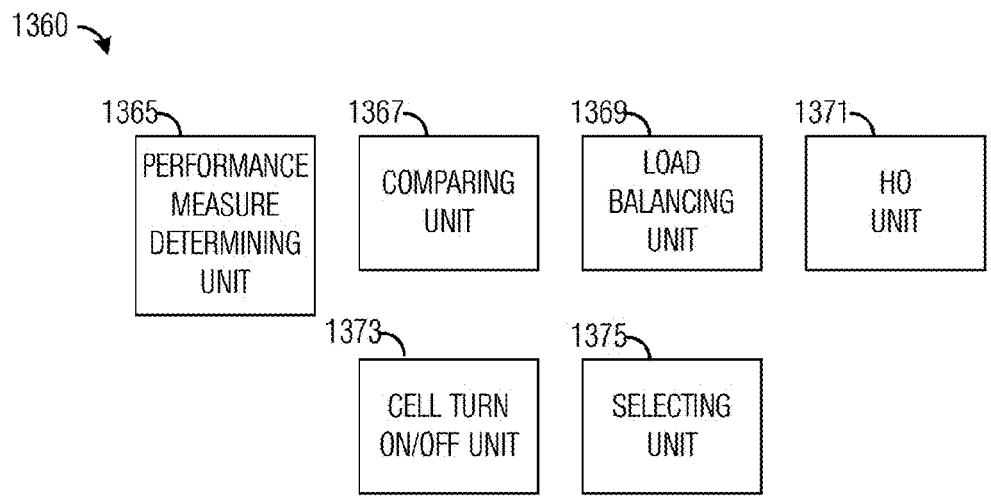
FIG. 13c illustrates diagram of an example topology adapting unit configured for cell selection for turn on or off according to example embodiments described herein.

FIG. 13c illustrates a diagram of an example topology adapting unit 1360 configured for cell selection for turn on or off. Topology adapting unit 1360 may be an example implementation of topology adapting unit 1222 of FIG. 12. Topology adapting unit 1360 includes a performance measure determining unit 1365 configured to determine a performance measure, such as a sum UE throughput, for cells in a wireless communications system or a portion thereof. A comparing unit 1367 is configured to compare performance measures of the wireless communications system as configured and with a simulated cell being turned off (or turned on). If the compared performance measures meet a specified threshold, a load balancing unit 1369 and a HO unit 1371 are configured to perform load balancing for the cell being turned off (or turned on) by moving UEs to (or from) nearby cells and initiating and/or completing a HO or attachment for the UEs so moved. A cell turn on/off unit 1373 is configured to turn off a cell. A selecting unit 1375 is configured to select a cell for evaluation. Selecting unit 1375 selects a cell that is on for evaluation of its impact on the wireless communications system when it is turned off, and selects a cell that is off for evaluation of its impact on the wireless communications system when it is turned on.

Although the present disclosure and its advantages have been described in detail, it should be understood that various changes, substitutions and alterations can be made herein without departing from the spirit and scope of the disclosure as defined by the appended claims.

What is claimed is:

1. A method for adapting communications system topology, the method comprising:
   receiving, by an adaptation device, first signal to interference plus noise ratio (SINR) values from user equipments in a communications system, the first SINR values associated with a transmission configuration as configured by the communications system, the first SINR values comprising a ratio of signal power to a sum of interference power and background noise power of a demodulated communications signal;
   exchanging utilization ratio (UR) values with cells in the communications system; and
   modifying, by the adaptation device, a topology of the communications system in accordance with the first SINR values received from the user equipments already attached to the communications system, wherein modifying the topology of the communications system comprises:
   determining a utility value for a user equipment with respect to each subset of cells in the communications system,
   selecting a second cell in the communications system with a highest of the utility values with respect to the user equipment, and
   informing the user equipment of the second cell.

2. The method of claim 1, wherein the first SINR values are received prior to modifying.

3. The method of claim 1, wherein modifying the topology of the communications system further comprises:
   determining second SINR values for a user equipment with respect to each subset of cells in the communications system,
   selecting a first cell in the communications system with a highest of the second SINR values with respect to the user equipment, and
   informing the user equipment of the first cell.

4. The method of claim 3, wherein the determining, the selecting, and the informing are repeated for each subset of the user equipments selected in accordance with a selection factor.

5. The method of claim 3, wherein the subset of cells comprises cells used for determining the second SINR values.

6. The method of claim 3, wherein the subset of the user equipments comprises user equipments already attached to the communications system.

7. The method of claim 1, wherein the determining, the selecting, and the informing are repeated for each subset of the user equipments.

8. The method of claim 1, wherein the utility value comprise a third SINR value and a function of the UR.

9. The method of claim 1, wherein modifying the topology of the communications system further comprises:
determining a first performance measure of the communications system;
selecting a third cell to turn off;
determining a second performance measure of the communications system with a hypothetical load balancing for user equipments attached to the third cell and with the third cell turned off; and
in response to determining that the second performance measure is better than the first performance measure,
performing load balancing for the user equipments attached to the third cell, and
turning off the third cell.

10. The method of claim 9, further comprising in response to determining that the second performance measure is not better than over the first performance measure, leaving the communications system unchanged.

11. The method of claim 1, wherein the adaptation device comprises one of a cell and a network entity.

12. A method for adapting communications system topology, the method comprising:
measuring, by an adaptation device, channels between the adaptation device and cells in the communications system;
deriving, by the adaptation device, first signal to interference plus noise ratio (SINR) values from the measured channels, the first SINR values comprising a ratio of signal power to a sum of interference power and background noise power of a demodulated communications signal;
receiving utilization ratio (UR) values for cells in the communications system; and
modifying, by the adaptation device, a topology of the communications system in accordance with the first SINR values, wherein modifying the topology of the communications system comprises:
determining utility values for the cells in the communications system, each utility value comprising a second SINR value for a cell and a function of a UR value for the cell;
selecting a target cell in the communications system with a highest of the utility values; and
handing over to the target cell.

13. The method of claim 12, wherein modifying the topology of the communications system comprises:
selecting a maximum of the first SINR values; and
handing over to a target cell associated with the maximum of the first SINR values.

14. The method of claim 12, wherein the adaptation device comprises a user equipment.

15. An adaptation device comprising:
a receiver configured to receive first signal to interference plus noise ratio (SINR) values from user equipments in a communications system, the first SINR values associated with a transmission configuration as configured by the communications system, the first SINR values comprising a ratio of signal power to a sum of interference power and background noise power of a demodulated communications signal; and
a processor operatively coupled to the receiver, the processor configured to modify a topology of the communications system in accordance with the first SINR values received from the user equipments already attached to the communications system, the processor further configured to exchange utilization ratio (UR) values with cells in the communications system, and wherein the processor is configured, for each subset of the user equipments in the communications system, to determine a utility value for the user equipment with respect to each subset of cells in the communications system, to select a second cell in the communications system with a highest of the utility values with respect to the user equipment, and to inform the user equipment of the second cell.

16. The adaptation device of claim 15, wherein the processor is further configured, for each subset of the user equipments in the communications system, to determine second SINR values for the user equipment with respect to each subset of cells in the communications system, to select a first cell in the communications system with a highest of the second SINR values with respect to the user equipment, and to inform the user equipment of the first cell.

17. The adaptation device of claim 15, wherein the utility value comprises a third SINR value and a function of the UR.

18. The adaptation device of claim 15, wherein the processor is further configured to determine a first performance measure of the communications system, to select a third cell to turn off, to determine a second performance measure of the communications system with a hypothetical load balancing of user equipments attached to the third cell and with the third cell turned off, and in response to determining that the second performance measure is better than over the first performance measure, to perform load balancing for the user equipments attached to the third cell, and to turn off the third cell.

19. The adaptation device of claim 15, wherein the adaptation device comprises one of a cell and a network entity.

20. An adaptation device comprising:
a receiver configured to receive information from cells in a communications system; and
a processor operatively coupled to the receiver, the processor configured to measure channels between the adaptation device and the cells in the communications system, to derive first signal to interference plus noise ratio (SINR) values from the measured channels, the first SINR values comprising a ratio of signal power to a sum of interference power and background noise power of a demodulated communications signal, and to modify a topology of the communications system in accordance with the first SINR values, wherein the receiver is further configured to receive utilization ratio (UR) values for cells in the communications system, and wherein the processor is configured to determine utility values for the cells in the communications system, each utility value comprising a second SINR value for a cell and a function of a UR value for the cell, to select a target cell in the communications system with a highest of the utility values, and to hand over to the target cell.

21. The adaptation device of claim 20, wherein the processor is configured to select a maximum of the first SINR values, and to hand over to a target cell associated with the maximum of the first SINR values.

22. The adaptation device of claim 20, wherein the adaptation device comprises a user equipment.

* * * * *